(12) United States Patent
Sugita et al.

(10) Patent No.: US 8,376,148 B2
(45) Date of Patent: Feb. 19, 2013

(54) INORGANIC POROUS SUPPORT-ZEOLITE MEMBRANE COMPOSITE, PRODUCTION METHOD THEREOF, AND SEPARATION METHOD USING THE COMPOSITE

(75) Inventors: Miki Sugita, Kanagawa (JP); Takahiko Takewaki, Kanagawa (JP); Kazunori Oshima, Kanagawa (JP); Naoko Fujita, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/219,277

(22) Filed: Aug. 26, 2011

(65) Prior Publication Data

US 2012/0024777 A1     Feb. 2, 2012

Related U.S. Application Data

(63) Continuation of application No. PCT/JP2010/053172, filed on Feb. 26, 2010.

(30) Foreign Application Priority Data

Feb. 27, 2009   (JP) .................................. 2009-046755
Nov. 11, 2009   (JP) .................................. 2009-258274

(51) Int. Cl.
  *B01D 71/02*     (2006.01)
  *B01D 69/12*     (2006.01)
  *B01D 61/00*     (2006.01)

(52) U.S. Cl. ............. 210/500.22; 210/500.25; 210/649; 210/653; 210/640; 96/154; 427/245; 95/45; 95/52

(58) Field of Classification Search .................. None
See application file for complete search history.

(56) References Cited

U.S. PATENT DOCUMENTS

| | | | |
|---|---|---|---|
| 5,554,286 A | | 9/1996 | Okamoto et al. |
| 2005/0268782 A1* | | 12/2005 | Kulkarni et al. .................... 96/4 |
| 2009/0266237 A1* | | 10/2009 | Serra Alfaro et al. ........... 96/154 |

FOREIGN PATENT DOCUMENTS

| | | |
|---|---|---|
| JP | 07-185275 | 7/1995 |
| JP | 2000-237561 | 9/2000 |
| JP | 2003-144871 | 5/2003 |
| JP | 2007-054772 | 3/2007 |
| JP | 2007-313389 | 12/2007 |
| JP | 2008-534272 | 8/2008 |
| WO | WO 2006/105771 | 10/2006 |

OTHER PUBLICATIONS

International Search Report issued May 25, 2010 in PCT/JP2010/053172 filed Feb. 26, 2010.

* cited by examiner

*Primary Examiner* — Krishnan S Menon
(74) *Attorney, Agent, or Firm* — Oblon, Spivak, McClelland, Maier & Neustadt, L.L.P.

(57) ABSTRACT

An object of the present invention is to provide a zeolite membrane composite satisfying both the treating amount and the separation performance at a practically sufficient level, which can be applied even in the presence of an organic material and can separate/concentrate an organic material-containing gas or liquid mixture and which is economic without requiring a high energy cost and is not limited in its application range; a production method thereof; and a separation or concentration method using the same. The present invention is an inorganic porous support-zeolite membrane composite, wherein the inorganic porous support contains a ceramic sintered body and the inorganic porous support-zeolite membrane composite has, as a zeolite membrane, a CHA-type zeolite crystal layer on the inorganic porous support surface.

25 Claims, 5 Drawing Sheets

INORGANIC POROUS SUPPORT-ZEOLITE MEMBRANE COMPOSITE, PRODUCTION METHOD THEREOF, AND SEPARATION METHOD USING THE COMPOSITE

TECHNICAL FIELD

The present invention relates to an inorganic porous support-zeolite membrane composite suitable for separation or concentration of an organic material-containing gas or liquid mixture, a production method thereof, and a method for separating an organic material by using the inorganic porous support-zeolite membrane composite.

BACKGROUND ART

Heretofore, in the separation or concentration of an organic material-containing gas or liquid mixture, for example, a distillation method, an azeotropic distillation method, a solvent extraction/distillation method, and a separation method using an adsorbent are being performed. However, these conventional methods are disadvantageous in that a lot of energy is required or the target range to which separation or concentration can be applied is limited.

In recent years, a membrane separation or concentration method using a membrane such as polymer membrane has been proposed as a separation method replacing such a conventional separation method. The polymer membrane has excellent processability and includes, for example, a flat membrane and a hollow yarn membrane. However, the polymer membrane is disadvantageously low in the heat resistance. Also, many of polymer membranes exhibit poor resistance to chemicals and swell upon contact particularly with an organic material such as organic solvent and organic acid, and the target range to which separation or concentration can be applied is limited.

On the other hand, a membrane separation or concentration method using a membrane formed of an inorganic material such as zeolite membrane has been proposed. The zeolite membrane used for separation or concentration is generally a zeolite membrane composite obtained by membranously forming a zeolite on a support. For example, a mixture of an organic material and water is flowed to the zeolite membrane composite, and water is selectively allowed to permeate therethrough, whereby the organic material can be separated or concentrated. In the membrane separation or concentration using an inorganic material membrane, the amount of energy used can be reduced as compared with separation by distillation or an adsorbent and additionally, the separation or concentration can be performed in a wider temperature range than that with the polymer membrane and furthermore, can be applied also to the separation of an organic material-containing mixture.

As for the separation using a zeolite membrane, a method where a zeolite having hydrophilicity is utilized for selective permeation of water has been proposed. For example, there have been proposed a method of allowing selective permeation of water by using an A-type zeolite membrane composite to concentrate an alcohol (Patent Document 1), a method of allowing selective permeation of water from a mixed system of an alcohol and water by using a mordenite-type zeolite membrane composite to concentrate the alcohol (Patent Document 2), and a method of allowing selective permeation of water from a mixed system of acetic acid and water by using a ferrierite-type zeolite membrane composite to separate/concentrate the acetic acid (Patent Document 3).

RELATED ART

Patent Document

Patent Document 1: JP-A-7-185275 (the term "JP-A" as used herein means an "unexamined published Japanese patent application")
Patent Document 2: JP-A-2003-144871
Patent Document 3: JP-A-2000-237561

SUMMARY OF THE INVENTION

Problems that the Invention is to Solve

However, a zeolite membrane satisfying both the treating amount and the separation performance at a sufficient level for practical use and having resistance to an organic material, particularly an organic acid, has not been found yet. The treating amount (permeation flow rate) of separation or concentration by a zeolite membrane is generally expressed by a permeation flux indicative of the weight of the permeated substance per unit time and unit plane area. In this case, as for the permeation flux of water, the permeation flux is preferably larger in view of practical utilization of the zeolite membrane and is supposed to be preferably at least $1 \text{ kg}/(\text{m}^2 \cdot \text{h})$.

However, the maximum permeation flux of the mordenite-type zeolite membrane composite described in Patent Document 2 is $0.6 \text{ kg}/(\text{m}^2 \cdot \text{h})$ for the water-ethanol system and $0.23 \text{ kg}/(\text{m}^2 \cdot \text{h})$ for the water/acetic acid system when the concentration of permeated water is 95 wt % or more, and this is insufficient as the treating amount required for practical utilization.

Also, the maximum permeation flux of the ferrierite-type zeolite membrane composite described in Patent Document 3 is $0.22 \text{ kg}/(\text{m}^2 \cdot \text{h})$ for the water-acetic acid system when the concentration of water permeated is 95 wt % or more, and the treating amount is insufficient for practical utilization.

Furthermore, in view of resistance to an organic material, the mordenite-type zeolite or ferrierite-type zeolite used for the above-described zeolite membrane allows a dealuminization reaction to proceed under acidic conditions and therefore, the $SiO_2/Al_2O_3$ ratio governing the hydrophilicity of the zeolite is generally expected to change. In turn, the zeolite membrane composite is expected to change in the separation performance as its service time is increased. For this reason, use under a condition involving the presence of an organic acid is not preferred. In addition, the A-type zeolite has a problem that it cannot be applied as a separation membrane in the presence of an organic acid, because the structure is destroyed upon contact with an acid.

An object of the present invention is to provide a zeolite membrane composite satisfying both the treating amount and the separation performance at a practically sufficient level in the separation or concentration by an inorganic material separation membrane, a production method thereof, and a separation or concentration method using the membrane composite.

Another object of the present invention is to provide a zeolite membrane composite satisfying both the treating amount and the separation performance at a sufficient level for practical utilization, which is economic without requiring a high energy cost and is not limited in its application range, a production method thereof, and a separation or concentration method using the membrane composite. Still another object of the present invention is to provide an inorganic porous composite which can be applied even in the presence of an organic material, particularly an organic acid, and can separate/concentrate an organic material-containing gas or liquid mixture, a production method thereof, and a separation/concentration method using the membrane composite, particularly, a method for separation/concentration of a mixed aqueous solution of an organic acid/water.

Means for Solving the Problems

As a result of continuous and intensive studies to solve those problems, the present inventors have found that the above-described objects can be attained by optimizing an inorganic porous support and/or a zeolite membrane. The present invention described below has been accomplished based on this finding.

<1> An inorganic porous support-zeolite membrane composite, wherein the inorganic porous support contains a ceramic sintered body and the inorganic porous support-zeolite membrane composite has, as the zeolite membrane, a CHA-type zeolite crystal layer on the inorganic porous support surface.

<2> An inorganic porous support-zeolite membrane composite, wherein the inorganic porous support-zeolite membrane composite has a CHA-type zeolite crystal layer as the zeolite membrane and in the X-ray diffraction pattern obtained by irradiating the zeolite membrane surface with an X-ray, the peak intensity near $2\theta=17.9°$ is 0.5 times or more the peak intensity near $2\theta=20.8°$.

<3> An inorganic porous support-zeolite membrane composite, wherein the inorganic porous support-zeolite membrane composite has a CHA-type zeolite crystal layer as the zeolite membrane and in the X-ray diffraction pattern obtained by irradiating the zeolite membrane surface with an X-ray, the peak intensity near $2\theta=9.6°$ is 4 times or more the peak intensity near $2\theta=20.8°$.

<4> The inorganic porous support-zeolite membrane composite as described in <1>, wherein in the X-ray diffraction pattern obtained by irradiating the zeolite membrane surface with an X-ray, the peak intensity near $2\theta=17.9°$ is 0.5 times or more the peak intensity near $2\theta=20.8°$.

<5> The inorganic porous support-zeolite membrane composite as described in <1>, <2> or <4>, wherein in the X-ray diffraction pattern obtained by irradiating the zeolite membrane surface with an X-ray, the peak intensity near $2\theta=9.6°$ is 4 times or more the peak intensity near $2\theta=20.8°$.

<6> The inorganic porous support-zeolite membrane composite as described in any one of <1> to <5>, wherein the molar ratio $SiO_2/Al_2O_3$ of the zeolite crystal layer is 5 or more.

<7> The inorganic porous support-zeolite membrane composite as described in any one of <1> to <6>, which allows for permeation of a highly permeable substance out of an organic material-containing gas or liquid mixture and can separate the highly permeable substance from the mixture.

<8> The inorganic porous support-zeolite membrane composite as described in <7>, wherein the organic material-containing gas or liquid mixture is a mixture of an organic material and water.

<9> The inorganic porous support-zeolite membrane composite as described in <7> or <8>, wherein the organic material is an organic acid.

<10> The inorganic porous support-zeolite membrane composite as described in <7> or <8>, wherein the organic material is at least one kind of a material selected from organic compounds containing an alcohol, an ether, an aldehyde, a ketone or a nitrogen.

<11> The inorganic porous support-zeolite membrane composite as described in any one of <1> to <10>, wherein the inorganic porous support contains at least one kind of a material selected from alumina, silica and mullite.

<12> A method for producing the inorganic porous support-zeolite membrane composite described in any one of <1> to <11>, which comprises crystallizing a CHA-type zeolite on the inorganic porous support surface.

<13> The method of producing the inorganic porous support-zeolite membrane composite as described in <12>, wherein after attaching a zeolite seed crystal to the inorganic porous support surface, the CHA-type zeolite is crystallized.

<14> The method of producing the inorganic porous support-zeolite membrane composite as described in <13>, wherein the zeolite seed crystal is a CHA-type zeolite.

<15> The method of producing the inorganic porous support-zeolite membrane composite as described in any one of <12> to <14>, wherein in performing crystallization of the CHA-type zeolite, a reaction mixture containing an Si element source and an Al element source is used as a raw material such that the molar ratio ($SiO_2/Al_2O_3$) as the ratio between Si and Al in terms of respective oxides becomes from 5 to 10,000.

<16> The method of producing the inorganic porous support-zeolite membrane composite as described in <15>, wherein an alkali metal ion is present in the reaction mixture.

<17> The method of producing the inorganic porous support-zeolite membrane composite as described in <15> or <16>, wherein an organic template is further used as a raw material and the organic template is a cation derived from 1-adamantanamine.

<18> A separation membrane comprising the inorganic porous support-zeolite membrane composite described in any one of <1> to <11>.

<19> A separation method comprising contacting an organic material-containing gas or liquid mixture with the inorganic porous support-zeolite membrane composite described in any one of <1> to <11> to allow for permeation of a highly permeable substance out of the mixture, thereby separating the highly permeable substance from the mixture.

<20> The separation method as described in <19>, wherein the organic material-containing gas or liquid mixture is a mixture of an organic acid and water.

<21> The separation method as described in <19>, wherein the organic material-containing gas or liquid mixture is a mixture of water and at least one kind of a material selected from organic compounds containing an alcohol, an ether, an aldehyde, a ketone or a nitrogen.

<22> A concentration method comprising contacting an organic material-containing gas or liquid mixture with the inorganic porous support-zeolite membrane composite described in any one of <1> to <11> to allow for permeation of a highly permeable substance out of the mixture, thereby concentrating the highly permeable substance.

<23> The concentration method as described in <22>, wherein the organic material-containing gas or liquid mixture is a mixture of water and at least one kind of a material selected from organic compounds containing an alcohol, an ether, an aldehyde, a ketone or a nitrogen.

Advantage of the Invention

The inorganic porous support-zeolite membrane composite of the present invention is a zeolite membrane composite for separation or concentration, ensuring a sufficiently large treating amount and an adequate separation performance also in practical use when separating or concentrating a specific compound from an organic material-containing gas or liquid mixture, which enables zeolite membrane-assisted separation or concentration from an organic material-containing gas or liquid mixture.

Furthermore, according to the production method for a zeolite membrane composite of the present invention, a zeolite membrane composite for separation or concentration having excellent acid resistance is obtained, which enables separation/concentration of an organic acid-containing mixture.

MODE FOR CARRYING OUT THE INVENTION

Figure 1:
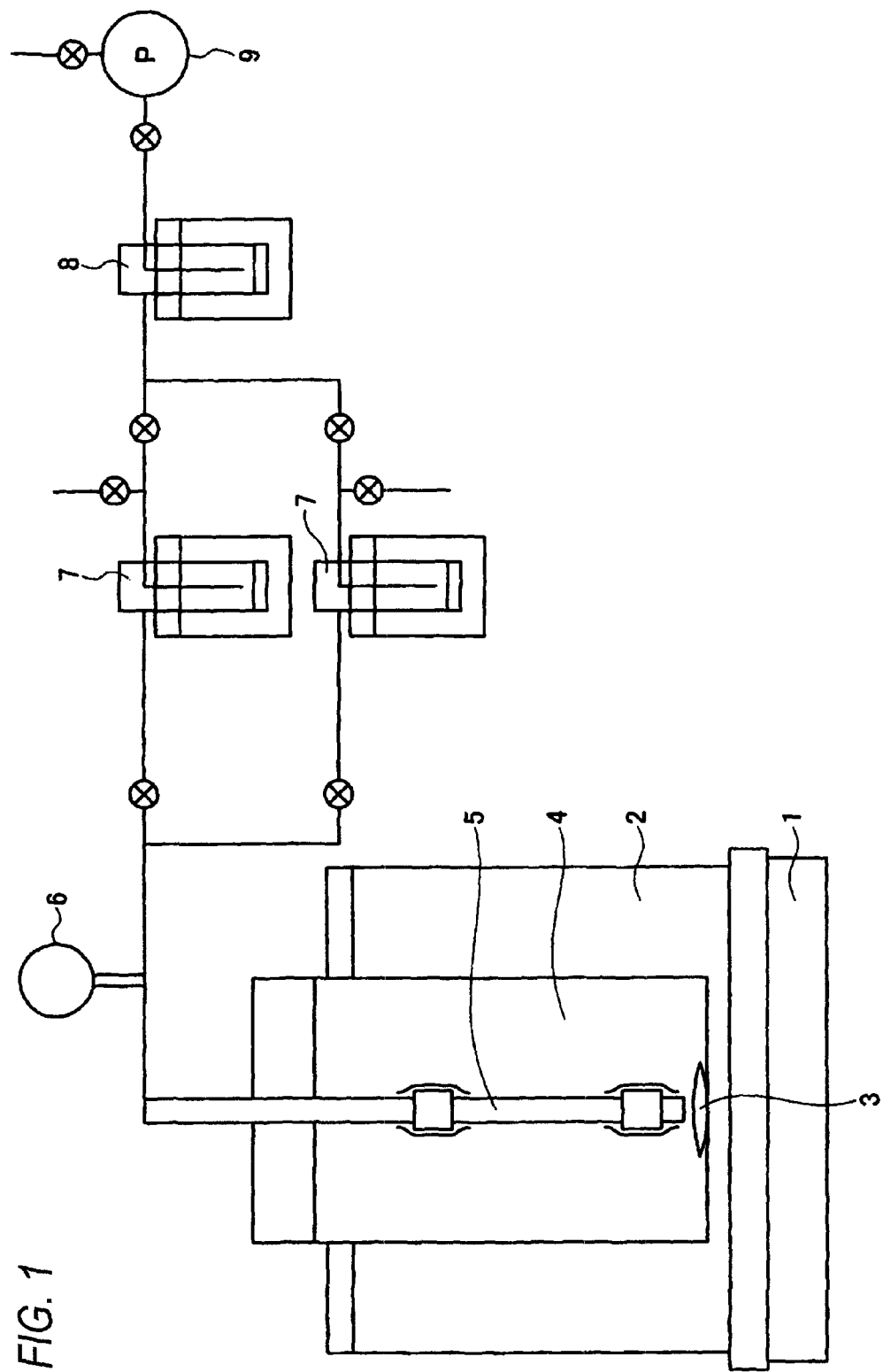
FIG. 1 A schematic view of the pervaporation test apparatus.

The mode for carrying out the present invention is described in detail below, but the following description of constitutional requirements is one example of the embodiment of the present invention, and the present invention is not limited to these contents and can be practiced by making various modifications within the scope of the purport thereof.

The inorganic porous support-zeolite membrane composite (hereinafter, sometimes simply referred to as a "zeolite membrane composite") of the present invention is obtained by membranously crystallizing a CHA-type zeolite on a surface layer of an inorganic porous support containing a ceramic sintered body.

First, respective components constituting the inorganic porous support-zeolite membrane composite of the present invention are specifically described.
(Inorganic Porous Support)

The inorganic porous support for use in the present invention is not particularly limited as long as it is porous and chemically stable to enable membranous crystallization of a zeolite on the surface layer. Examples thereof include a ceramic sintered body such as silica, α-alumina, γ-alumina, mullite, zirconia, titania, yttria, silicon nitride and silicon carbide, a sintered metal such as iron, bronze and stainless steel, glass, and a carbon molding.

The "inorganic porous support containing a ceramic sintered body" as used in the present invention indicates a porous support containing a material obtained by sintering a ceramic that is a solid material with the basic components or a majority thereof being composed of an inorganic nonmetallic substance.

Specifically, the inorganic porous support includes ceramic sintered bodies containing α-alumina, γ-alumina, mullite, zirconia, titania, yttria, silicon nitride or silicon carbide. One of these may be used alone or a plurality thereof may be mixed and used. Because, such a ceramic sintered body is partially converted into a zeolite during synthesis of a zeolite membrane and produces an effect of increasing the interfacial adherence.

Above all, an inorganic porous support containing at least one member out of alumina, silica and mullite is preferred in that partial conversion of the inorganic porous support into a zeolite readily occurs to establish strong binding between the inorganic porous support and the CHA-type zeolite and in turn, a dense membrane having high separation performance is liable to be formed.

The shape of the inorganic porous support for use in the present invention is not limited as long as a gas mixture or a liquid mixture can be effectively separated, and specific examples thereof include a plate, a tube, a cylinder, a honeycomb in which many columnar or prismatic holes are present, and a monolith. The inorganic porous support may have any of these shapes.

In the inorganic porous support for use in the present invention, a zeolite is crystallized on its surface layer (hereinafter, sometimes referred to as an "inorganic porous support surface layer").

The average pore size of the inorganic porous support surface layer is not particularly limited but is preferably controlled, and it is preferred that the pore size is usually 0.02 μm or more, preferably 0.05 μm or more, more preferably 0.1 μm or more, and is usually 20 μm or less, preferably 10 μm or less, more preferably 5 μm or less.

The surface of the inorganic porous support is preferably smooth and, if desired, the surface may be polished with a file.

Incidentally, the inorganic porous support surface layer means an inorganic porous support surface portion on which a CHA-type zeolite is crystallized, and as long as it is a surface, the portion may be any surface of each shape or may be a plurality of faces. For example, in the case of a cylindrical tube support, the portion may be a surface on the outer side or a surface on the inner side and depending on the case, may be surfaces on both the outer side and the inner side.

Furthermore, in the inorganic porous support for use in the present invention, the pore size of the portion other than the inorganic porous support surface layer is not particularly limited and need not be particularly controlled, but usually, the porosity of the portion other than the inorganic porous support surface layer is preferably from 20 to 60%. The porosity of the portion other than the inorganic porous support surface layer governs the permeation flux when separating a gas or a liquid and if it is less than the lower limit above, diffusion of the permeated material tends to be inhibited, whereas if the porosity exceeds the above-described upper limit, the strength of the inorganic porous support is liable to be impaired.
(CHA-Type Zeolite)

The CHA-type zeolite for use in the present invention indicates a zeolite having a CHA structure in terms of the code specified by International Zeolite Association (IZA) and is a zeolite having the same crystal structure as that of the naturally-occurring chabazite. The CHA-type zeolite takes a structure characterized by having a three-dimensional pore composed of an oxygen 8-membered ring with a size of 3.8×3.8 Å, and the structure is defined by the X-ray diffraction data.

The framework density of the CHA-type zeolite for use in the present invention is 14.5 T/1,000 Å. The framework density means the number of elements constituting the framework, other than oxygen, per 1,000 Å$^3$ of the zeolite, and this value depends on the zeolite structure. Incidentally, the relationship between the framework density and the zeolite structure is set forth in ATLAS OF ZEOLITE FRAMEWORK TYPES, Fifth Revised Edition, ELSEVIER (2001).

The molar ratio $SiO_2/Al_2O_3$ of the CHA-type zeolite for use in the present invention is not particularly limited but is usually 5 or more, preferably 8 or more, more preferably 10 or more, still more preferably 12 or more. The upper limit of the molar ratio above is usually 2,000 or less, preferably 1,000 or less, more preferably 500 or less, still more preferably 100 or less. This is the same as the molar ratio $SiO_2/Al_2O_3$ of the zeolite membrane described later.

(Zeolite Membrane)

The "zeolite membrane" as used in the present invention indicates a membranous material composed of a zeolite and is preferably a membrane obtained by crystallizing a zeolite on the inorganic porous support surface layer. As the component constituting the membrane, for example, an inorganic binder such as silica and alumina, an organic material such as polymer, and a silylating agent for modifying the zeolite surface, may be contained, if desired, in addition to the zeolite.

In the present invention, the zeolite membrane may partially contain an amorphous component or the like but is preferably composed of substantially only a zeolite. Specifically, the zeolite membrane is a zeolite membrane containing a CHA-type zeolite as the main component, which may partially contain a zeolite of another structure such as mordenite type or MFI type or contain an amorphous component or the like, and is preferably a zeolite membrane composed of substantially only a CHA-type zeolite.

The thickness of the zeolite membrane for use in the present invention is not particularly limited but is usually 0.1 μm or more, preferably 0.6 μm or more, more preferably 1.0 μm or more, and is usually 100 μm or less, preferably 60 μm or less, more preferably 20 μm or less.

Incidentally, the zeolite crystal layer as used in the present invention indicates a zeolite membrane-like material having the thickness of the zeolite membrane above.

The particle diameter of the zeolite forming the zeolite membrane for use in the present invention is not particularly limited, but if it is too small, the permeation selectivity tends to be impaired due to, for example, increase in the grain boundary. For this reason, the particle diameter is usually 30 nm or more, preferably 50 nm or more, more preferably 100 nm or more, and the upper limit is not more than the thickness of the membrane. It is more preferred that the particle diameter of the zeolite is the same as the thickness of the membrane. Because, when the particle diameter of the zeolite is the same as the thickness of the membrane, the grain boundary of the zeolite becomes smallest. A zeolite membrane obtained by hydrothermal synthesis sometimes allows the particle diameter of the zeolite and the thickness of the membrane to become the same and therefore, is preferred.

The molar ratio $SiO_2/Al_2O_3$ of the zeolite membrane for use in the present invention is not particularly limited but is usually 5 or more, preferably 8 or more, more preferably 10 or more, still more preferably 12 or more. The upper limit is usually 2,000 or less, preferably 1,000 or less, more preferably 500 or less, still more preferably 100 or less. If the molar ratio $SiO_2/Al_2O_3$ is less than the lower limit above, the durability is liable to be impaired, whereas if it exceeds the above-described upper limit, the permeation flux tends to become small due to excessively strong hydrophobicity.

The molar ratio $SiO_2/Al_2O_3$ as used in the present invention is a numerical value obtained by a scanning electron microscope-energy dispersive X-ray spectroscopy (SEM-EDX). In order to obtain the information of only a membrane of several microns, the measurement is performed usually at an X-ray accelerating voltage of 10 kV.

As the zeolite membrane for use in the present invention, a membranous material composed of a zeolite may be directly used, but the zeolite membrane is usually used as a zeolite membrane composite obtained by membranously fixing a zeolite on various supports, preferably, as an inorganic porous support-zeolite membrane composite described in detail below.

(Inorganic Porous Support-Zeolite Membrane Composite)

The inorganic porous support-zeolite membrane composite of the present invention is in a state where a zeolite is membranously fixed on the surface layer of an inorganic porous support and depending on the case, partially fixed even inside the inorganic porous support.

Examples of the method for forming such a zeolite membrane composite include a method of membranously crystallizing a zeolite on an inorganic porous support to form the composite, a method of fixing a zeolite on an inorganic porous support by using an inorganic binder, an organic binder or the like, a method of fixing a polymer having dispersed therein a zeolite, and a method of impregnating an inorganic porous support with a zeolite slurry and depending on the case, causing the support to suction the slurry, thereby fixing a zeolite on the inorganic porous support.

In a preferred embodiment of the present invention, a zeolite is membranously crystallized on an inorganic porous support surface layer.

Specifically, a CHA-type zeolite is membranously crystallized on an inorganic porous support surface layer and is usually crystallized by hydrothermal synthesis.

The zeolite membrane for use in the present invention is not particularly limited in its position on the inorganic porous support surface but in the case of using a tubular inorganic porous support, a zeolite membrane may be formed on the outer surface or inner surface and depending on the system to which applied, may be formed on both surfaces. Also, the zeolite may be stacked on a surface of an inorganic porous support or may be crystallized to fill the inside of a pore in the surface layer of a porous support. In this case, it is important that a crack or a continuous micropore is not present inside the crystallized membrane layer, and formation of a so-called dense membrane leads to enhancement of separation performance.

In the inorganic porous support-zeolite membrane composite of the present invention, the peak intensity near $2\theta=17.9°$ in the X-ray diffraction pattern is preferably 0.5 times or more the peak intensity near $2\theta=20.8°$.

The peak intensity as used herein indicates a value obtained by subtracting a background value from the measured value and is, in terms of the peak intensity ratio represented by (peak intensity near $2\theta=17.9°$)/(peak intensity near $2\theta=20.8°$), preferably 0.5 or more, more preferably 1 or more, still more preferably 1.2 or more, yet still more preferably 1.5 or more. The upper limit is not particularly limited but is usually 1,000 or less.

In the inorganic porous support-zeolite membrane composite of the present invention, the peak intensity near $2\theta=9.6°$ in the X-ray diffraction pattern is preferably 4 times or more the peak intensity near $2\theta=20.8°$.

The peak intensity is, in terms of the peak intensity ratio represented by (peak intensity near $2\theta=9.6°$)/(peak intensity near $2\theta=20.8°$), preferably 4 or more, more preferably 6 or more, still more preferably 8 or more, yet still more preferably 10 or more. The upper limit is not particularly limited but is usually 1,000 or less.

The X-ray diffraction pattern as used herein is obtained by irradiating the surface on the side having attached thereto mainly a zeolite with X-ray of $CuK\alpha$ as a radiation source in a $\theta/2\theta$ scan axis configuration. The shape of the sample measured may be any as long as it is a shape allowing X-ray irradiation to the surface on the side where the zeolite of the membrane composite is mainly attached, and the as-is membrane composite prepared fully expressing the characteristics of the membrane composite or a membrane composite cut to an appropriate size complying with restriction by an apparatus is preferred.

In the case where the surface of the membrane composite is a curved surface, the X-ray diffraction pattern as used herein may be measured by fixing the irradiation width with use of an automatic variable slit. The X-ray diffraction pattern when using an automatic variable slit indicates a pattern after performing variable→fixed slit correction.

The peak near 2θ=17.9° indicates a maximum peak out of peaks present in the range of 17.9°±0.6° among peaks not assigned to the base material, and the peak near 2θ=20.8° indicates a maximum peak out of peaks present in the range of 20.8°±0.6° among peaks not assigned to the base material.

Also, the peak near 2θ=9.6° indicates a maximum peak out of peaks present in the range of 9.6°±0.6° among peaks not assigned to the base material.

According to COLLECTION OF SIMULATED XRD POWDER PATTERNS FOR ZEOLITE, Third Revised Edition, ELSEVIER (1996), assuming that the space group using rhombohedral setting is:

$$R\overline{3}m \qquad \text{[Math. 1]}$$

(No. 166), the peak near 2θ=9.6° in the X-ray diffraction pattern is a peak assigned to a plane with an index of (1,0,0) in the CHA structure.

Also, according to COLLECTION OF SIMULATED XRD POWDER PATTERNS FOR ZEOLITE, Third Revised Edition, ELSEVIER (1996), assuming that the space group using rhombohedral setting is:

$$R\overline{3}m \qquad \text{[Math. 2]}$$

(No. 166), the peak near 2θ=17.9° in the X-ray diffraction pattern is a peak assigned to a plane with an index of (1,1,1) in the CHA structure.

According to COLLECTION OF SIMULATED XRD POWDER PATTERNS FOR ZEOLITE, Third Revised Edition, ELSEVIER (1996), assuming that the space group using rhombohedral setting is:

$$R\overline{3}m \qquad \text{[Math. 3]}$$

(No. 166), the peak near 2θ=20.8° in the X-ray diffraction pattern is a peak assigned to a plane with an index of (2,0,−1) in the CHA structure.

According to COLLECTION OF SIMULATED XRD POWDER PATTERNS FOR ZEOLITE, Third Revised Edition, ELSEVIER (1996), the typical ratio between the intensity of the peak assigned to (1,0,0) plane and the intensity of the peak assigned to (2,0,−1) plane is 2.5. Therefore, this ratio being 4 or more is considered to mean, for example, that zeolite crystals are oriented to align the (1,0,0) plane of the CHA structure nearly in parallel with the membrane composite surface when rhombohedral setting is used. Oriented growth of zeolite crystals in the zeolite membrane composite is advantageous in that a dense membrane having high separation performance is formed.

According to COLLECTION OF SIMULATED XRD POWDER PATTERNS FOR ZEOLITE, Third Revised Edition, ELSEVIER (1996), the typical ratio between the intensity of the peak assigned to (1,1,1) plane and the intensity of the peak assigned to (2,0,−1) plane is 0.3. Therefore, this ratio being 0.5 or more is considered to mean, for example, that zeolite crystals are oriented to align the (1,1,1) plane of the CHA structure nearly in parallel with the membrane composite surface when rhombohedral setting is used. Oriented growth of zeolite crystals in the zeolite membrane composite is advantageous in that a dense membrane having high separation performance is formed.

(Production Method of Zeolite Membrane)

As the method for crystallizing a zeolite membrane in the present invention, any method may be used as long as a CHA-type zeolite is membranously crystallized on an inorganic porous support to form a CHA-type zeolite membrane. Above all, a method of putting an inorganic porous support in a reaction mixture for use in the production of a CHA-type zeolite and directly performing the hydrothermal synthesis to crystallize a CHA-type zeolite on the inorganic porous support surface layer is preferred.

As a specific preferred method, in the method for membranously crystallizing a CHA-type zeolite on an inorganic porous support surface layer, an aqueous reaction mixture homogenized by adjusting the composition is put in a heat-resistant pressure-resistant vessel, such as autoclave, having weakly fixed in the inside thereof an inorganic porous support, and heated in a tightly closed state.

(Reaction Mixture)

For example, the reaction mixture above preferably contains an Si element source, an Al element source, an organic template (if desired) and water, where an alkali source is further added, if desired.

The Si element source and Al element source used in the reaction mixture are not particularly limited, and as the Si element source, for example, any of amorphous silica, colloidal silica, silica gel, sodium silicate, amorphous aluminosilicate gel, tetraethoxysilane (TEOS) and trimethylethoxysilane may be used. As the Al element source, for example, any of sodium aluminate, aluminum hydroxide, aluminum sulfate, aluminum nitrate, aluminum oxide and amorphous aluminosilicate gel may be used.

In the production of the CHA-type zeolite for use in the present invention, an organic template (structure-directing agent) may be used, if desired, and a zeolite synthesized using an organic template is preferred, because when synthesized using an organic template, the ratio of silicon atom to aluminum atom in the crystallized zeolite becomes high and the acid resistance is enhanced. The organic template is not particularly limited in its kind as long as a CHA type can be formed.

One kind of a template may be used, or two or more kinds of templates may be used in combination. For example, organic templates described in U.S. Pat. No. 4,544,538 and U.S. Patent Application Publication No. 2008/0075656A1 may be used in an appropriate combination. The template is specifically a cation derived from an alicyclic amine, such as cation derived from 1-adamantanamine, cation derived from 3-quinuclidinal, and cation derived from 3-exo-aminonorbornene, preferably a cation derived from 1-adamantanamine. Because, when a cation derived from 1-adamantanamine is used as the organic template, a CHA-type zeolite capable of forming a dense membrane is crystallized. Also, not only a CHA-type zeolite with sufficient hydrophilicity enabling selective permeation of water through the membrane can be produced but also a CHA-type zeolite excellent in the acid resistance is obtained.

Among cations derived from 1-adamantanamine, an N,N,N-trialkyl-1-adamantanammonium cation is more preferred. In the case of an N,N,N-trialkyl-1-adamantanammonium cation, three alkyl groups are three independent alkyl groups and usually a lower alkyl group, preferably a methyl group. A specific preferred cation is an N,N,N-trimethyl-1-adamantanammonium cation. Such a cation is accompanied with an anion not adversely affecting the formation of a CHA-type zeolite. Representative examples of the anion include a halogen ion such as Cl⁻, Br⁻ and I⁻, a hydroxide ion, an acetate, a sulfate and a carboxylate. Above all, a hydroxide ion is preferably used. As other organic templates, an N,N,N-trialkylbenzylammonium cation may be used. Also in this case, the alkyls are three independent alkyls and usually a lower alkyl, preferably methyl. An N,N,N-trimethylbenzylammonium cation is most preferred.

As the alkali source used in the reaction mixture above, for example, a hydroxide ion as the counter anion of the organic template, an alkali metal hydroxide such as NaOH and KOH, and an alkaline earth metal hydroxide such as $Ca(OH)_2$ may be used.

The alkali is not particularly limited in its kind but is usually Na, K, Li, Rb, Cs, Ca, Mg, Sr or Ba, preferably Na or K, more preferably K. Two or more kinds of alkalis may be used in combination, and specifically, it is preferred to use Na and K in combination.

The ratio of Si element source to Al element source in the reaction mixture is usually expressed by the molar ratio between oxides of respective elements, that is, the molar ratio $SiO_2/Al_2O_3$ (hereinafter, sometimes simply referred to as a "ratio $SiO_2/Al_2O_3$"). The ratio $SiO_2/Al_2O_3$ is not particularly limited but is usually 5 or more, preferably 8 or more because of capability of producing a dense CHA-type zeolite membrane, more preferably 10 or more, still more preferably 15 or more, and is usually 10,000 or less, preferably 1,000 or less, more preferably 300 or less, still more preferably 100 or less.

When the ratio $SiO_2/Al_2O_3$ is in this range, a dense CHA-type zeolite membrane is advantageously produced. Also, the ratio in the range above is preferred because the produced CHA-type zeolite exhibits strong hydrophilicity and allows for selective permeation of a hydrophilic compound, particularly water, out of an organic material-containing mixture. Furthermore, a CHA-type zeolite being highly acid-resistant and insusceptible to dealuminization is obtained. Incidentally, in addition to Al, other elements, for example, an element such as Ga, Fe, B, Ti, Zr, Sn and Zn, may be contained.

When the ratio $SiO_2/Al_2O_3$ is in the range above, a CHA-type zeolite capable of forming a dense membrane is advantageously crystallized. Also, the ratio in this range is preferred because not only a CHA-type zeolite with sufficient hydrophilicity enabling selective permeation of water through the membrane can be produced but also a CHA-type zeolite excellent in the acid resistance is obtained.

As for the ratio between silica source and organic template in the reaction mixture, the molar ratio of organic template to $SiO_2$ (ratio of organic template/$SiO_2$) is usually from 0.005 to 1, preferably from 0.01 to 0.4, more preferably from 0.02 to 0.2. When the ratio is in this range, a dense CHA-type zeolite membrane can be produced and in addition, the produced CHA-type zeolite is highly acid-resistant and insusceptible to elimination of Al.

Assuming that the alkali metal or alkaline earth metal is M and the valence thereof is n (1 or 2), the ratio between Si element source and alkali source is, in terms of molar ratio $M_{(2/n)}O/SiO_2$, usually from 0.02 to 0.5, preferably 0.04 to 0.4, more preferably from 0.05 to 0.3.

Among alkali metals, K is preferably contained, because a dense membrane with high crystallinity is produced. In this case, the molar ratio of K to all alkali metals including K and/or alkaline earth metals is usually from 0.01 to 1, preferably from 0.1 to 1, more preferably from 0.3 to 1. Also, when K is added, assuming that the space group using rhombohedral setting is $$R\bar{3}m \qquad \text{[Math. 4]}$$

(No. 166), the ratio between the peak intensity near $2\theta=9.6°$ as a peak assigned to a plane with an index of (1,0,0) in the CHA structure or the peak intensity near $2\theta=17.9°$ as a peak assigned to (1,1,1) plane and the peak intensity near $2\theta=20.8°$ as a peak assigned to (2,0,−1) plane tends to become large.

The ratio between Si element source and water is, in terms of molar ratio of water to $SiO_2$, usually from 10 to 1,000, preferably from 30 to 500, more preferably from 40 to 200, still more preferably from 50 to 150. When the molar ratio of substances in the reaction mixture is in this range, a dense CHA-type zeolite membrane can be produced. The amount of water is particularly important for the production of a dense CHA-type zeolite membrane and under the conditions of the amount of water being large compared with silica, finer crystals tend to be readily produced to form a dense membrane than under general conditions in the powder synthesis method. The amount of water when synthesizing a powdered CHA-type zeolite is, in terms of molar ratio $H_2O/SiO_2$, generally on the order of 15 to 50, and the synthesis is preferably performed under the condition where the molar ratio $H_2O/SiO_2$ is high, that is, the amount of water is large. Specifically, the condition of the ratio being from 50 to 150 is preferred, because a CHA-type zeolite is crystallized as a dense membrane on the inorganic porous support surface layer and a membrane composite having high separation performance is obtained.

(Production Method of Composite)

For crystallizing, on a support surface layer, a membranous CHA-type zeolite which is dense and applicable to separation of a gas or liquid mixture and can achieve a sufficient permeation flux, it is insufficient to merely apply the above-described publications as they are, and conditions for membranous formation by these methods must be variously studied.

In the present invention, at the time of membranously crystallizing a CHA-type zeolite on the inorganic porous support surface layer, a seed crystal may not be present, but addition of a seed crystal to the reaction system is preferred in that crystallization of a CHA-type zeolite can be accelerated. The method for adding a seed crystal is not particularly limited, but a method of adding a seed crystal to the reaction mixture as in when synthesizing a powdered CHA-type zeolite, or a method of attaching a seed crystal on the inorganic porous support surface may be employed. As the production method of a membrane composite, it is preferred to attach a seed crystal on the inorganic porous support surface. When a seed crystal is previously attached on the support surface, a dense zeolite membrane having good separation performance is readily produced.

The seed crystal for use in the present invention can be any kind of zeolite as long as it accelerates the crystallization, but for achieving efficient crystallization, the seed crystal is preferably a CHA-type zeolite. The CHA-type zeolite used as the seed crystal is not particularly limited, but the particle diameter thereof is preferably smaller. If desired, the seed crystal may be pulverized. The particle diameter is usually 0.5 nm or more, preferably 1 nm or more, more preferably 2 nm or more, and is usually 5 μm or less, preferably 3 μm or less, more preferably 2 μm or less.

In the present invention, the method for attaching a seed crystal on the inorganic porous support surface is not particularly limited, but examples thereof include a dip method of dispersing the seed crystal in a solvent such as water and dipping the support in the dispersed liquid, thereby attaching the seed crystal to the surface, and a method of mixing the seed crystal with a solvent such as water to make a slurry and coating the slurry on the inorganic porous support surface. In view of controlling the amount of the attached seed crystal and producing a membrane composite with good reproducibility, a dip method is preferred.

In the present invention, the solvent in which the seed crystal is dispersed is not particularly limited, but water is preferred. The amount of the dispersed seed crystal is not particularly limited but is usually 0.01 wt % or more, preferably 0.1 wt % or more, more preferably 0.5 wt % or more, and is usually 20 wt % or less, preferably 10 wt % or less, more preferably 5 wt % or less, still more preferably 3 wt % or less, based on the total weight of the liquid dispersion. If the amount of the seed crystal dispersed is too small, the amount of the seed crystal attached on the inorganic porous support is small and a portion where a CHA-type zeolite is not produced may be partially created on the support surface at the hydrothermal synthesis, giving rise to the possibility of forming a defective membrane, whereas if the amount of the seed crystal in the liquid dispersion is excessively large, since the amount of the seed crystal attached on the inorganic porous support surface by the dip method is almost constant, the excessively large amount of the seed crystal dispersed leads to an increase in the wasted seed crystal and this is disadvantageous in view of cost.

In the present invention, after attaching the seed crystal by the dip method or the coating of a slurry, the inorganic porous support is preferably dried and then subjected to membrane synthesis.

The weight of the seed crystal previously attached on the support surface is not particularly limited but is, in terms of the weight per 1 $m^2$ of the support, usually 0.01 g or more, preferably 0.05 g of more, more preferably 0.1 g or more, and is usually 100 g or less, preferably 50 g or less, more preferably 10 g or less, still more preferably 8 g or less. If the amount of the seed crystal is less than the lower limit above, the crystal tends to be hardly produced, resulting in insufficient membrane growth or non-uniform membrane growth, and a dense film is sometimes unlikely to be formed. If the amount of the seed crystal exceeds the upper limit above, surface unevenness may be increased by the seed crystal or a spontaneous nucleus may be liable to grow due to a seed crystal fallen from the support surface, giving rise to inhibition of membrane growth on the support, and a dense membrane may be unlikely to be formed.

In the case of crystallizing the zeolite by hydrothermal synthesis, the inorganic porous support may be fixed in any of vertical, horizontal and other configurations. In this case, the zeolite may be crystallized in a static condition or may be crystallized by stirring the reaction mixture.

The temperature when crystallizing the zeolite is not particularly limited but is usually 100° C. or more, preferably 120° C. or more, more preferably 150° C. or more, and is usually 200° C. or less, preferably 190° C. or less, more preferably 180° C. or less. If the reaction temperature is too low, a CHA-type zeolite may not be crystallized and this is not preferred. If the reaction temperature is excessively higher than the range above, a zeolite of a type different from the CHA type may be disadvantageously produced.

The heating time is not particularly limited but is usually 1 hour or more, preferably 5 hours or more, more preferably 10 hours or more, and is usually 10 days or less, preferably 5 days or less, more preferably 3 days or less, still more preferably 2 days or less. If the reaction time is too short, a CHA-type zeolite may not be crystallized and this is not preferred. If the reaction time is excessively long, a zeolite of a type different from the CHA type may be disadvantageously produced.

The pressure at the crystallization is not particularly limited, and a self-generated pressure created when heating the reaction mixture put in a closed vessel at the temperature in the range above may be sufficient, but an inert gas such as nitrogen may be added.

The inorganic porous support-zeolite membrane composite obtained by hydrothermal synthesis is preferably washed with water and then subjected to removal of the organic template in the zeolite. The method for removing the organic template includes calcinig, extraction and the like and the method is not limited, but calcining is preferred. The preferred calcining temperature is usually 350° C. or more, preferably 400° C. or more, more preferably 430° C. or more, still more preferably 480° C. or more, and is usually 900° C. or less, preferably 850° C. or less, more preferably 800° C. or less, still more preferably 750° C. or less. If the calcining temperature is too low, the percentage at which the organic template remains tends to increase and a zeolite with small pores may be obtained, as a result, the permeation flux at the separation or concentration may be disadvantageously decreased. If the calcining temperature is excessively high, since the difference in the coefficient of thermal expansion between the support and the zeolite is large, cracking may readily occur in the zeolite membrane and the zeolite membrane is liable to make a defect and be reduced in the separation performance.

The calcining time is not particularly limited as long as the organic template is fully removed, but the calcining time is preferably 1 hour or more, more preferably 5 hours or more. The upper limit is not particularly limited but is usually within 24 hours. The calcining is generally performed in an air atmosphere but may be performed in an atmosphere containing oxygen.

The temperature rise rate at the calcining is preferably as low as possible so as to reduce the occurrence of cracking in the zeolite film due to difference in the coefficient of thermal expansion between the support and the zeolite. The temperature rise rate is usually 5° C./min or less, preferably 2° C./min or less, more preferably 1° C./min or less, still more preferably 0.5° C./min or less, and in view of workability, is usually 0.1° C./min or more. The temperature drop rate after calcining must be also controlled so as to avoid occurrence of cracking in the zeolite membrane. The temperature drop rate is preferably as low as possible, similarly to the temperature rise rate. The temperature drop rate is usually 5° C./min or less, preferably 2° C./min or less, more preferably 1° C./min or less, still more preferably 0.5° C./min or less, and in view of workability, is usually 0.1° C./min or more.

The inorganic porous support-zeolite membrane composite may be subjected to ion exchange, if desired. In the case of synthesizing the zeolite by using a template, the ion exchange is usually performed after removing the template by calcining or the like. Examples of the ion that is ion-exchanged include a proton, an alkali metal ion such as $Na^+$, $K^+$ and $Li^+$, an alkaline earth metal ion such as $Ca^{2+}$, $Mg^{2+}$, $Sr^{2+}$ and $Ba^{2+}$, and an ion of transition metal such as Fe, Cu and Zn. Among these, a proton and an alkali metal ion such as $Na^+$, $K^+$ and $Li^+$ are preferred.

As the method for ion exchange, the inorganic porous support-zeolite membrane composite after calcining (for example, when a template is used) is treated with an aqueous solution containing an ammonium salt such as $NH_4NO_3$ and $NaNO_3$ or an exchanging ion or depending on the case, with an acid such as hydrochloric acid at a temperature of usually from room temperature to 100° C., washed with water and, if desired, calcined at 200 to 500° C.

(Separation/Concentration Method)

The method for separating or concentrating an organic material-containing gas or liquid mixture by using the inorganic porous support-zeolite membrane composite of the present invention is a method where an organic material-containing gas or liquid mixture is contacted with either one side of the support side or the zeolite membrane side through the inorganic porous support having thereon a zeolite membrane and the pressure on the opposite side is set to be lower than that on the side contacted with the mixture, thereby allowing for selective permeation of a permeable substance (a highly permeable substance in the mixture) through the CHA-type zeolite membrane from the mixture. In this way, a highly permeable substance can be separated from the mixture. As a result, the concentration of a specific organic material in the organic material-containing mixture (a low permeable substance in the mixture) is increased, and the specific organic material is thereby separated/recovered or concentrated. To speak specifically, in the case of a mixture of water and an organic material, since the zeolite membrane usually has high permeability to water, water and an organic material are separated from the mixture and the organic material is concentrated in the original mixture. The separation or concentration method called permeable pervaporation or vapor permeation is one of modes.

The zeolite membrane composite of the present invention is not particularly limited in its shape and may employ any shape such as tube, hollow yarn, monolith and honeycomb. The size is also not particularly limited, but, for example, in the case of a tube shape, a length of 2 to 200 cm, an inner diameter of 0.5 to 2 cm, and a thickness of 0.5 to 4 mm are usually practical and preferred.

One separation function of the zeolite membrane composite of the present invention is separation as a molecular sieve, and the composite is suitably used for the separation of a gas or liquid molecule having a size of 3.8 Å or more that is the effective pore size of the CHA-type zeolite, and a gas or liquid molecule smaller than that. The molecule subjected to separation has no upper limit in the size, but the size of the molecule is usually about 100 Å or less.

Another separation function of the zeolite membrane composite of the present invention is separation utilizing the difference in hydrophilicity. Although it may vary depending on the kind of the zeolite, in general, when a fixed amount of Al is contained in the zeolite framework, a hydrophilic property is developed. The molar ratio $SiO_2/Al_2O_3$ in the crystal can be controlled by controlling the crystallization conditions of the CHA-type zeolite membrane. Use of such a hydrophilic membrane makes it possible to separate or concentrate an organic material from a mixture of an organic material and water by allowing selective membrane permeation of a water molecule. That is, selective permeation of water from a mixed aqueous solution of an organic material and water, for example, organic acids/water, alcohols/water, ketones such as acetone, methyl isobutyl ketone/water, aldehydes/water, ethers such as dioxane and tetrahydrofuran/water, a nitrogen-containing compound (N-containing organic material) such as amide (e.g., dimethylformamide, N-methylpyrrolidone)/water, and esters such as acetic acid ester/water, is allowed, whereby an organic material can be separated or concentrated. In this case, the water content in the mixture of an organic material and water is not particularly limited, and even for a mixture having such a high water content as breaking the structure of an A-type zeolite, for example, a water content of 20 wt % or more, high selectivity and high permeation flux can be realized without involving structure breakage.

In systems other than an organic acid/water, thanks to high acid resistance, the membrane composite can be also used even when an organic acid or an inorganic acid is present.

In this way, the zeolite membrane composite of the present invention can realize high selectivity and high permeation flux even in the separation from an organic material-containing mixture having a high water content or the separation under acidic conditions. Accordingly, when separation of a mixture that is usually separated by distillation is performed using the zeolite membrane composite of the present invention, the energy necessary for separation can be reduced as compared with distillation. The zeolite membrane composite of the present invention can perform the separation from a mixture having a water content over a wide range, so that separation can be achieved for a system which could not be separated before. For example, the conventional A-type zeolite membrane cannot perform separation from an organic material-containing mixture having a high water content and therefore, the A-type zeolite membrane must be used after concentrating the organic material to about 90% by distillation. However, when the zeolite membrane composite of the present invention is used, water and an organic material can be separated even from an organic material-containing mixture having a high water content of, for example, 50% or more and the organic material can be concentrated. In separating water and an organic material by using the zeolite membrane composite of the present invention, all steps for concentrating the organic material to a desired concentration may be performed using the zeolite membrane composite, or the zeolite membrane composite and a separation method such as distillation, pressure swing adsorption (PSA) and temperature swing adsorption (TSA) may be appropriately combined, and by adjusting the conditions, separation with optimal energy efficiency can be achieved.

Examples of the organic material which can be separated using the zeolite membrane composite of the present invention include carboxylic acids such as acetic acid, propionic acid, formic acid, lactic acid, oxalic acid, tartaric acid and benzoic acid, organic acids such as sulfonic acid, sulfinic acid, barbituric acid, uric acid, phenol, enol, diketone-type compound, thiophenol, imide, oxime, aromatic sulfonamide and primary or secondary nitro compound, alcohols such as methanol, ethanol and isopropanol, ketones such as acetone and methyl isobutyl ketone, aldehydes such as acetaldehyde, ethers such as dioxane and tetrahydrofuran, nitrogen-containing organic compounds (N-containing organic materials) such as amide (e.g., dimethylformamide, N-methylpyrrolidone), and esters such as acetic acid ester. Among these, when an organic acid is separated from a mixture of water and the organic acid, the effect of the inorganic porous support-zeolite membrane composite can be distinctly achieved because its advantage point in both molecular sieve and hydrophilicity is shown in this case. A preferred example is separation from a mixture of carboxylic acids and water, and separation of acetic acid and water is more preferred. In the case of separating an organic material and water from a mixture of water and an organic material other than an organic acid, the carbon number of the organic material is preferably 2 or more, more preferably 3 or more.

The inorganic porous support-zeolite membrane composite of the present invention, when used, functions as a separation membrane, preferably as a permeable vapor separation membrane, and enables membrane separation with practically sufficient treating amount and adequate separation performance of separating a specific compound from an organic material-containing gas or liquid mixture and further concentrating the compound. The sufficient processing amount as used herein indicates that the permeation flux of a substance permeating the membrane is $1 \text{ kg}/(m^2 \cdot h)$ or more. Also, the adequate separation performance means that the separation coefficient=(Pα/β)/(Fα/Fβ) [wherein Pα is the weight percent concentration of the main component in the permeated solution, Pβ is the weight percent concentration of the subspecies in the permeated solution, Fα is the weight percent concentration, in the mixture subjected to separation, of the component working out to the main component in the permeated solution, and Fβ is the weight percent concentration, in the mixture subjected to separation, of the component working out to the subspecies in the permeated solution] generally used in membrane separation to indicate the separation performance is 100 or more or the concentration of the main component in the permeated solution is 95 wt % or more.

Membrane separation of an organic material-containing mixed solution, satisfying both sufficient treating amount and adequate separation performance, cannot be achieved by the conventional mordenite-type zeolite membrane composite or ferrierite-type zeolite membrane composite. In the present invention, the pore structure of the CHA-type zeolite is a three-dimensional structure and this is presumed allow a molecule to more easily pass through a pore than in the mordenite-type zeolite membrane with a one-dimensional pore structure and enable achieving high permeation flux and sufficient treating amount. In a dense zeolite membrane having high separation performance, the main flow channel of the permeating substance is the pore in the zeolite crystal and therefore, it is presumed that the zeolite membrane having a structure with many pores can achieve both sufficient treating amount and high separation performance. The amount of pores in the crystal can be estimated also from the framework density of the zeolite. The framework density of the CHA-type zeolite is 14.5 T/1000 Å$^3$, whereas the framework density is 17.2 T/1000 Å$^3$ for mordenite and 17.6 T/1000 Å$^3$ for ferrierite. Therefore, also in terms of framework density, the CHA-type zeolite crystal is presumed to have many spaces acting as a flow channel for the permeating substance.

Unlike the A-type zeolite or mordenite-type zeolite, the CHA-type zeolite having a high molar ratio $SiO_2/Al_2O_3$ is excellent in the acid resistance and therefore, the inorganic porous support-zeolite membrane composite of the present invention is suitable for separation of an organic acid-containing mixture. The CHA-type zeolite crystallized from a reaction mixture having a high molar ratio $SiO_2/Al_2O_3$ and containing an organic template scarcely allows for escape of Al even under acidic conditions and is stable also in the structure. On the other hand, in the mordenite-type zeolite, dealuminization proceeds under acidic conditions. The change in the crystal structure of the mordenite-type zeolite due to progress of dealuminization is small but since the molar ratio $SiO_2/Al_2O_3$ in the crystal probably changes toward an increasing direction, hydrophilicity of the crystal in the mordenite-type zeolite membrane may be decreased and in the separation utilizing hydrophilicity, the separation performance may be impaired. Also, it is suspected that the structure of the A-type zeolite is broken by an acid and the zeolite does not function as a membrane in the presence of an organic acid.

The zeolite membrane composite of the present invention has acid resistance and therefore, can be effectively utilized, for example, for separation or concentration from an organic acid-containing mixture, particularly, separation or concentration of an organic acid by selective permeation of water from a mixture of water and an organic acid such as acetic acid, or for separation of water so as to accelerate an esterification reaction.

EXAMPLES

The present invention is described in greater detail below based on Examples, but the present invention is not limited to these Examples as long as its purport is observed.

X-Ray Diffraction (XRD) Measurement Method

The XRD measurement was performed under the following conditions.
Name of Apparatus:
 X' PertPro MPD manufactured by PANalytical, the Netherlands
Specification of Optical System:
 Incident side: sealed X-ray tube (CuKα)
 Soller Slit (0.04 rad)
 Divergence Slit (Variable Slit)
 Sample Stage:
 XYZ stage
 Light Receiving Side:
 semiconductor array detector (X' Celerator)
 Ni-filter
 Soller Slit (0.04 rad)
 Goniometer radius: 240 mm
Measurement Conditions:
 X-Ray output (CuKα): 45 kV, 40 mA
 Scan axis: θ/2θ
 Scan range (2θ): 5.0-70.0°
 Measurement Mode: Continuous
 Reading width: 0.05°
 Counting time: 99.7 sec
 Automatic variable slit (Automatic-DS):
 1 mm (irradiation width)
 Horizontal Divergence Mask:
 10 mm (irradiation width)

Incidentally, the X-ray was delivered in the direction perpendicular to the axial direction of a cylindrical tube. In order to eliminate noise and the like as much as possible, out of two lines at which the cylindrical tube-shaped membrane composite placed on the sample stage contacts with the plane parallel to the sample stage surface, X-ray was concentrated not on the sample stage surface but concentrated mainly on another line present above the sample stage surface.

SEM-EDX Measurement Method
Apparatus:
 SEM: FE-SEM Hitachi: S-4800
 EDX: EDAX Genesis
Accelerating voltage: 10 kV X-Ray quantitative analysis was performed by scanning the entire surface of visual field (25 μm×18 μm) at a magnification of 5,000 times.

Example 1

For the production of a CHA-type zeolite membrane, an aqueous N,N,N-trimethyl-1-adamantanammonium hydroxide (TMADOH) solution was prepared by referring to the description in U.S. Pat. No. 4,544,538. This Example is described below.

5.5 Gram of 1-adamantanamine (produced by Aldrich) was dissolved in 75 ml of methanol, and 24.2 g of potassium carbonate was added thereto. This mixture was stirred for 30 minutes, and 10 ml of iodonium methane was added dropwise thereto. After stirring for one day and night, 50 ml of methylene chloride was added, and the solid was filtered. The solvent of the obtained solution was removed by means of an evaporator to obtain a solid. An operation of adding 130 ml of methylene chloride to the solid, filtering it and removing the solvent was repeating twice. Thereafter, the obtained solid was recrystallized using methanol, and the recrystallized solid was filtered, washed with diethyl ether and then dried to obtain N,N,N-trimethyl-1-adamantanammonium iodide (TMADI). This TMADI was dissolved in water, ion-exchanged with an anion exchange resin (SA-10A, produced by Mitsubishi Chemical Corporation) and concentrated in an evaporator to obtain an aqueous N,N,N-trimethyl-1-adamantanammonium hydroxide solution. The concentration of N,N,N-trimethyl-1-adamantanammonium hydroxide in the obtained aqueous solution was found to be 0.75 mmol/g by titration. Also, the amount of K contained in the aqueous solution was 1.84 wt %.

An inorganic porous support-(CHA-type) zeolite membrane composite was produced by hydrothermally synthesizing a CHA-type zeolite directly on an inorganic porous support.

The following was prepared as a reaction mixture for hydrothermal synthesis.

In a mixture containing 6.9 g of 1 mol/L-NaOH aqueous solution and 103.6 g of water, 0.43 g of aluminum hydroxide (containing 53.5 wt % of $Al_2O_3$, produced by Aldrich) was added and dissolved with stirring to make a transparent solution. Thereto, 9.2 g of the aqueous N,N,N-trimethyl-1-adamantanammonium hydroxide (TMADOH) solution prepared above (containing 0.17 g of K in this solution) was added as an organic template, and 10.4 g of colloidal silica (Snowtex-40, produced by Nissan Chemicals Industries, Ltd.) was further added. This mixture was stirred for 3 hours to prepare a mixture for hydrothermal synthesis.

As the inorganic porous support, a mullite tube PM (outer diameter: 12 mm, inner diameter: 9 mm) manufactured by Nikkato Corporation was used after cutting the tube into a length of 80 mm and then subjecting it to smoothing of the outer surface with water-resistant sandpaper, washing in an ultrasonic washer and drying. In advance of hydrothermal synthesis, a CHA-type zeolite seed crystal of about 0.5 μm crystallized by performing hydrothermal synthesis in the same manner as above at 160° C. for 2 days according to a gel composition of $SiO_2/Al_2O_3/NaOH/H_2O/TMADOH=1/0.033/0.1/40/0.1$ was attached on the support by a dip method.

The support was dipped in water having dispersed therein about 1 wt % of the seed crystal for a predetermined time and then dried at 100° C. for 5 hours or more to attach the seed crystal. The weight of the seed crystal attached was about 3 g/m². This support attached with the seed crystal was dipped in the vertical direction in a Teflon (registered trademark)-made inner cylinder containing the reaction mixture above and after tightly closing the autoclave, heated at 160° C. for 48 hours under self-generated pressure. When a predetermined time was passed, the system was allowed to cool, and the support-zeolite membrane composite was taken out of the reaction mixture, washed and dried at 100° C. for 5 hours or more. After the drying, the cylindrical tube-shaped membrane composite in a state of the zeolite before template calcining (hereinafter, sometimes referred to as "as-made") was sealed at one end, and the other end was connected to a vacuum line to reduce the pressure inside the tube. The permeation flux of air was measured by a flowmeter provided in the vacuum line, as a result, the permeation flux was 0 ml/(m²●min).

The zeolite membrane composite before template calcining (as-made) was calcined in an electric furnace at 550° C. for 10 hours. At this time, both the temperature rise rate and the temperature drop rate were set to 0.5° C./min. From the difference between the weight of the membrane composite after calcining and the weight of the support, the weight of the CHA-type zeolite crystallized on the support was 120 g/m². The SEM observation revealed that the film thickness was about 15 μm.

XRD of the produced membrane was measured, as a result, it was confirmed that a CHA-type zeolite was produced. The XRD measurement was performed under the above-described conditions. Also, the measurement was performed by fixing the irradiation width to 1 mm with an automatic variable slit, and variable slit→fixed slit conversion was performed using an XRD analysis software, JADE 7.5.2 (Japanese version), of Materials Data, Inc. to obtain an XRD pattern. The (intensity of peak near) 2θ=17.9°/(intensity of peak near 2θ=20.8°) was 2.9, and this infers an orientation to (1,1,1) plane in the rhombohedral setting.

Also the inorganic porous support-CHA-type zeolite membrane composite was cut into a strip form and observed by SEM, as a result, crystals were densely produced on the surface.

Furthermore, the molar ratio $SiO_2/Al_2O_3$ of the zeolite membrane was measured by SEM-EDX and found to be 22.

Example 2

An inorganic porous support CHA-type zeolite membrane composite was produced by hydrothermally synthesizing a CHA-type zeolite directly on an inorganic porous support.

The following was prepared as a reaction mixture for hydrothermal synthesis.

In a mixture containing 10.5 g of 1 mol/L-NaOH aqueous solution, 7.0 g of 1 mol/L-KOH aqueous solution and 100.0 g of water, 0.88 g of aluminum hydroxide (containing 53.5 wt % of $Al_2O_3$, produced by Aldrich) was added and dissolved with stirring to make a transparent solution. Thereto, 2.95 g of an aqueous N,N,N-trimethyl-1-adamantanammonium hydroxide (TMADOH) solution (containing 25 wt % of TMADAOH, produced by Sachem Inc.) was added as an organic template, and 10.5 g of colloidal silica (Snowtex-40, produced by Nissan Chemicals Industries, Ltd.) was further added. This mixture was stirred for 2 hours to prepare a mixture for hydrothermal synthesis.

As the inorganic porous support, a support treated in the same manner as in Example 1 was used. In advance of hydrothermal synthesis, a CHA-type zeolite seed crystal having a particle diameter of about 0.5 μm was attached on the support in the same manner as in Example 1. The weight of the seed crystal attached was about 5 g/m².

Similarly to Example 1, this support attached with the seed crystal was dipped in the vertical direction in a Teflon (registered trademark)-made inner cylinder containing the reaction mixture above and after tightly closing the autoclave, heated at 160° C. for 48 hours under self-generated pressure. When a predetermined time was passed, the system was allowed to cool, and the support-zeolite membrane composite was taken out of the reaction mixture, washed and dried at 100° C. for 5 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m²●min). The zeolite membrane composite before template calcining was calcined in an electric furnace at 500° C. for 5 hours. From the difference between the weight of the membrane composite after calcining and the weight of the support, the weight of the CHA-type zeolite crystallized on the support was 120 g/m². The SEM observation revealed that the film thickness was about 15 μm.

Figure 2:
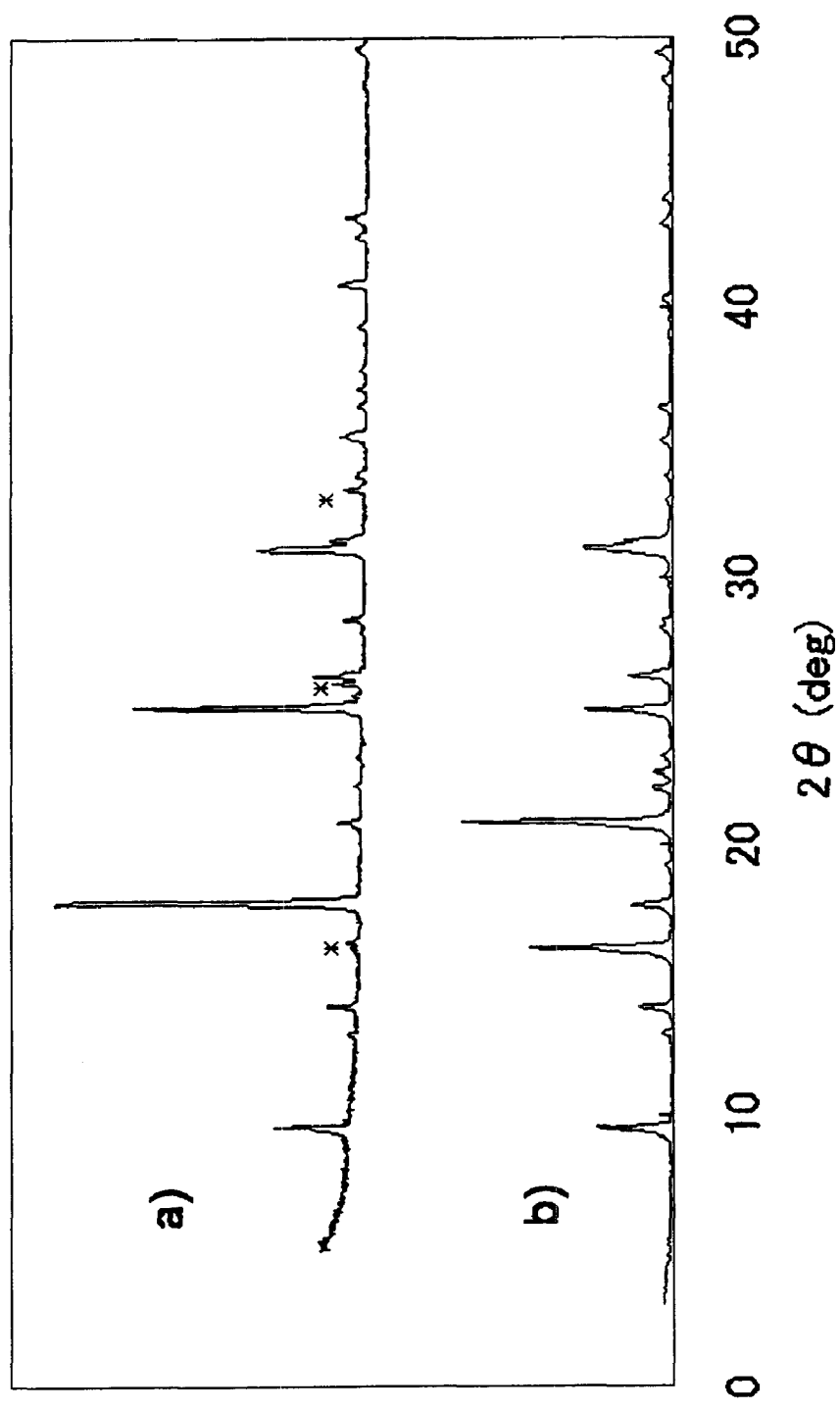
FIG. 2 The XRD measurement results of the zeolite membrane described in Example 2.

XRD of the produced zeolite membrane was measured, as a result, it was confirmed that a CHA-type zeolite was produced. The XRD measurement was performed in the same manner as in Example 1. FIG. 2 shows the comparison between XRD of the produced membrane and XRD of SSZ- 13 that is a powdered CHA-type zeolite (a zeolite generally called SSZ-13 in U.S. Pat. No. 4,544,538, hereinafter referred to as SSZ-13) used as the seed crystal. In FIG. 2, a) shows XRD of the membrane of Example 2 and b) shows that of SSZ-13. Also, in the Figure, * is the peak assigned to the support. It is seen that in XRD of the produced membrane, the intensity of the peak near 2θ=17.9° is significantly large compared with XRD of SSZ-13 which is a powdered CHA-type zeolite. The (intensity of peak near) 2θ=17.9°/(intensity of peak near 2θ=20.8°) of SSZ-13 which is a powdered CHA-type zeolite was 0.2, whereas the (intensity of peak near 2θ=17.9°)/(intensity of peak near 2θ=20.8°) of the produced membrane was 12.6, inferring an orientation to (1,1,1) plane in the rhombohedral setting.

Also, the molar ratio $SiO_2/Al_2O_3$ of the zeolite membrane was measured by SEM-EDX and found to be 17.

Example 3

An inorganic porous support-CHA-type zeolite membrane composite was produced by hydrothermally synthesizing a CHA-type zeolite directly on an inorganic porous support.

The following was prepared as a reaction mixture for hydrothermal synthesis.

In a mixture containing 10.5 g of 1 mol/L-NaOH aqueous solution, 7.0 g of 1 mol/L-KOH aqueous solution and 100.4 g of water, 0.88 g of aluminum hydroxide (containing 53.5 wt % of $Al_2O_3$, produced by Aldrich) was added and dissolved with stirring to make a transparent solution. Thereto, 2.37 g of an aqueous N,N,N-trimethyl-1-adamantanammonium hydroxide (TMADOH) solution (containing 25 wt % of TMADAOH, produced by Sachem Inc.) was added as an organic template, and 10.5 g of colloidal silica (Snowtex-40, produced by Nissan Chemicals Industries, Ltd.) was further added. This mixture was stirred for 2 hours to prepare a mixture for hydrothermal synthesis.

As the inorganic porous support, a support treated in the same manner as in Example 1 was used. In advance of hydrothermal synthesis, a CHA-type zeolite seed crystal having a particle diameter of about 2 μm was attached on the support in the same manner as in Example 1. The weight of the seed crystal attached was about 2 g/m². The CHA-type zeolite having a particle diameter of about 2 μm used for the seed crystal was a zeolite which was crystallized by performing hydrothermal synthesis using an aqueous 25 wt % N,N,N-trimethyl-1-adamantanammonium hydroxide (TMADOH) solution produced by Sachem at 160° C. for 2 days according to a gel composition of $SiO_2/Al_2O_3/NaOH/KOH/H_2O/TMA-DOH=1/0.066/0.15/0.1/100/0.1$ and then subjected to filtration, washing with water and drying.

Similarly to Example 1, this support attached with the seed crystal was dipped in the vertical direction in a Teflon (registered trademark)-made inner cylinder containing the reaction mixture above and after tightly closing the autoclave, heated at 160° C. for 48 hours under self-generated pressure. When a predetermined time was passed, the system was allowed to cool, and the support-zeolite membrane composite was taken out of the reaction mixture, washed and dried at 100° C. for 5 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m².min). The zeolite membrane composite before template calcining was calcined in an electric furnace at 500° C. for 5 hours. From the difference between the weight of the membrane composite after calcining and the weight of the support, the weight of the CHA-type zeolite crystallized on the support was 130 g/m².

XRD of the produced zeolite membrane was measured, as a result, it was confirmed that a CHA-type zeolite was produced. The XRD measurement was performed in the same manner as in Example 1. It is seen from the results of XRD of the produced membrane, the intensity of the peak near 2θ=17.9° is significantly large. The (intensity of peak near 2θ-17.9°)/(intensity of peak near 2θ=20.8°) of the produced membrane was 1.0.

Also, the molar ratio $SiO_2/Al_2O_3$ of the zeolite membrane was measured by SEM-EDX and found to be 20.

Example 4

An inorganic porous support-CHA-type zeolite membrane composite was produced in the same manner as in Example 3 except for using a porous alumina tube (outer diameter: 12 mm, inner diameter: 9 mm) as the inorganic porous support.

From the results of XRD of the produced CHA-type zeolite membrane, the (intensity of peak near 2θ=17.9°)/(intensity of peak near 2θ=20.8°) was 1.2. Also, the molar ratio $SiO_2/Al_2O_3$ of the zeolite membrane was measured by SEM-EDX and found to be 17.

Example 5

An inorganic porous support-CHA-type zeolite membrane composite was produced by hydrothermally synthesizing a CHA-type zeolite directly on an inorganic porous support.

The following was prepared as a reaction mixture for hydrothermal synthesis.

In a mixture containing 32 g of 1 mol/L-NaOH aqueous solution, 48 g of 1 mol/L-KOH aqueous solution and 457 g of water, 4.0 g of aluminum hydroxide (containing 53.5 wt % of $Al_2O_3$, produced by Aldrich) was added and dissolved with stirring to make a nearly transparent solution. Thereto, 13.5 g of an aqueous N,N,N-trimethyl-1-adamantanammonium hydroxide (TMADOH) solution (containing 25 wt % of TMADAOH, produced by Sachem Inc.) was added as an organic template, and 48 g of colloidal silica (Snowtex-40, produced by Nissan Chemicals Industries, Ltd.) was further added. This mixture was stirred for 2 hours to prepare a mixture for hydrothermal synthesis.

As the inorganic porous support, a support treated in the same manner as in Example 1 was used. In advance of hydrothermal synthesis, the same treatment as in Example 1 was performed except for attaching a CHA-type zeolite seed crystal having a particle diameter of about 2 μm on the support. The weight of the seed crystal attached was about 5 g/m².

Similarly to Example 1, this support attached with the seed crystal was dipped in the vertical direction in a Teflon (registered trademark)-made inner cylinder containing the reaction mixture above. The Teflon (registered trademark)-made inner cylinder was placed in a 1 L-volume stainless steel-made autoclave and after tightly closing the autoclave and raising the temperature over 5 hours, the support was heated at 160° C. for 48 hours under self-generated pressure. During the reaction, the reaction mixture was mixed with a stirring blade rotating at 200 rpm. When a predetermined time was passed, the system was allowed to cool, and the support-zeolite membrane composite was taken out of the reaction mixture, washed and dried at 100° C. for 4 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m²·min). The zeolite membrane composite before template calcining was calcined in an electric furnace at 500° C. for 5 hours. From the difference between the weight of the membrane composite after calcining and the weight of the support, the weight of the CHA-type zeolite crystallized on the support was 120 g/m².

Figure 3:
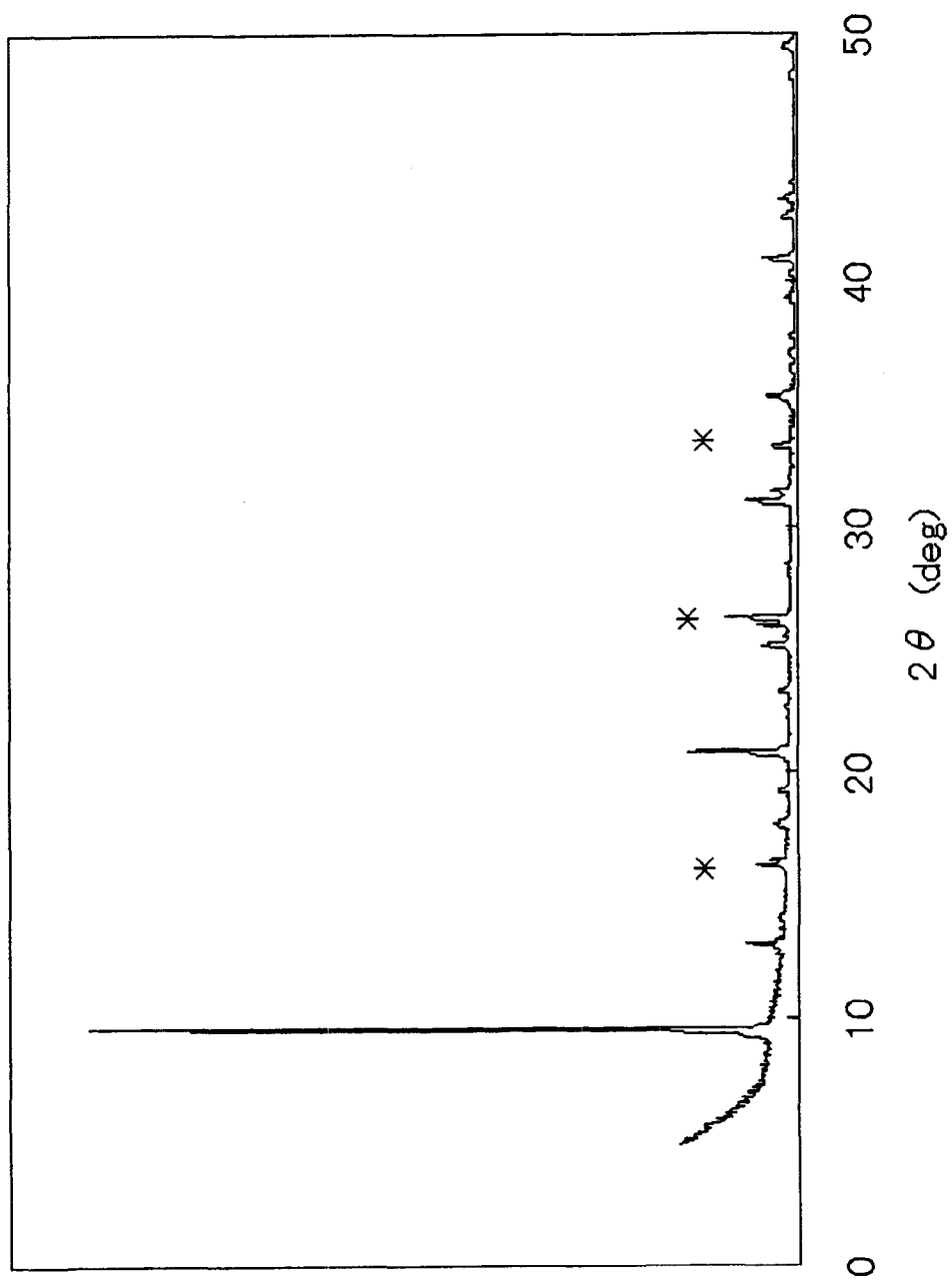
FIG. 3 The XRD measurement results of the zeolite membrane described in Example 5.

XRD of the produced zeolite membrane was measured, as a result, it was confirmed that a CHA-type zeolite was produced. The XRD measurement was performed in the same manner as in Example 1. FIG. 3 shows XRD of the produced membrane. In the Figure, * is the peak assigned to the support.

It is seen that in XRD of the produced membrane, the intensity of the peak near 2θ=9.6° is significantly large compared with XRD of SSZ-13 which is a powdered CHA-type zeolite. The (intensity of peak near 2θ=9.6°)/(intensity of peak near 2θ=20.8°) of the produced membrane was 6.8 and large compared with the ratio (intensity of peak near 2θ=9.6°)/(intensity of peak near 2θ=20.8°)=2.5 in XRD of the powdered CHA described in COLLECTION OF SIMULATED XRD POWDER PATTERNS FOR ZEOLITE, Third Revised Edition, ELSEVIER (1996), inferring an orientation to (1,0,0) plane in the rhombohedral setting. Also, the molar ratio $SiO_2/Al_2O_3$ of the zeolite membrane was measured by SEM-EDX and found to be 17.

Example 6

An inorganic porous support-CHA-type zeolite membrane composite was produced by hydrothermally synthesizing a CHA-type zeolite directly on an inorganic porous support.

The following was prepared as a reaction mixture for hydrothermal synthesis.

In a mixture containing 30.1 g of 1 mol/L-NaOH aqueous solution and 66.0 g of water, 0.057 g of aluminum hydroxide (containing 53.5 wt % of $Al_2O_3$, produced by Aldrich) was added and dissolved with stirring to make a nearly transparent solution. Thereto, 12.7 g of an aqueous N,N,N-trimethyl-1-adamantanammonium hydroxide (TMADOH) solution (containing 25 wt % of TMADAOH, produced by Sachem) was added as an organic template, and 23.6 g of colloidal silica (Snowtex-40, produced by Nissan Chemicals Industries, Ltd.) was further added. This mixture was stirred for 2 hours to prepare a mixture for hydrothermal synthesis.

As the inorganic porous support, a support treated in the same manner as in Example 1 was used. In advance of hydrothermal synthesis, a CHA-type zeolite seed crystal of about 0.5 μm was attached on the support in the same manner as in Example 1. The weight of the seed crystal attached was about 3 g/m².

Similarly to Example 1, this support attached with the seed crystal was dipped in the vertical direction in a Teflon (registered trademark)-made inner cylinder containing the reaction mixture above and after tightly closing the autoclave, heated at 160° C. for 48 hours under self-generated pressure. When a predetermined time was passed, the system was allowed to cool, and the support-zeolite membrane composite was taken out of the reaction mixture, washed and dried at 100° C. for 4 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m².min). The zeolite membrane composite before template calcining was calcined in an electric furnace at 500° C. for 5 hours. From the difference between the weight of the membrane composite after calcining and the weight of the support, the weight of the CHA-type zeolite crystallized on the support was 100 g/m².

Figure 4:
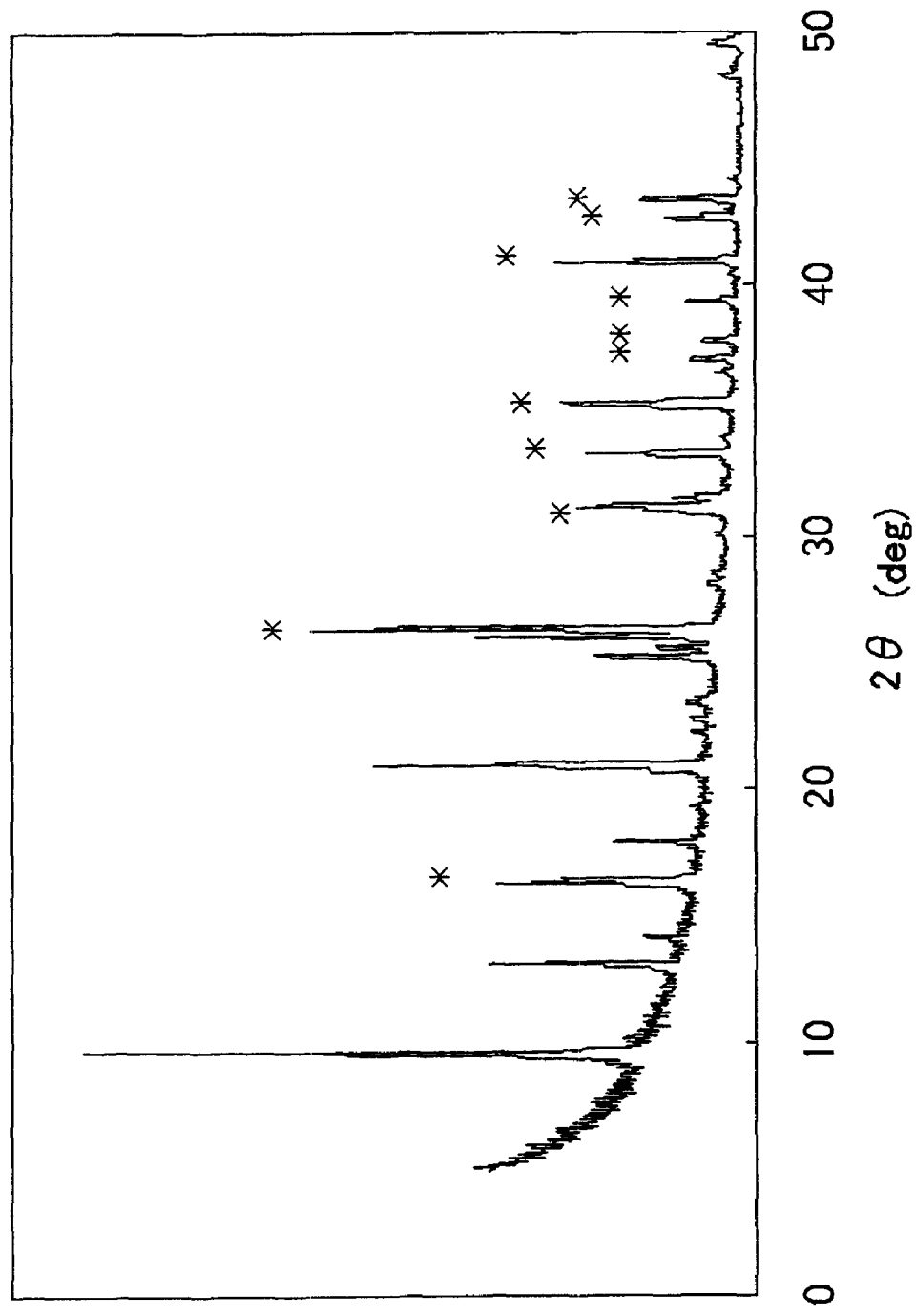
FIG. 4 The XRD measurement results of the zeolite membrane described in Example 6.

XRD of the produced zeolite membrane was measured, as a result, it was confirmed that a CHA-type zeolite was produced. The XRD measurement was performed in the same manner as in Example 1. FIG. 4 shows XRD of the produced membrane. In the Figure, * is the peak assigned to the support.

In XRD of the produced membrane, the (intensity of peak near 2θ=9.6°)/(intensity of peak near 2θ=20.8°) was 1.7, and the (intensity of peak near 2θ=17.9°)/(intensity of peak near 2θ=20.8°) was 0.3.

In this way, a peak showing a specific intensity was not found in XRD of the produced membrane. This infers that the produced membrane is oriented to neither (1,0,0) plane nor (1,1,1) plane in the rhombohedral setting.

Also, the molar ratio $SiO_2/Al_2O_3$ of the zeolite membrane was tried to measure by SEM-EDX, but an exact value was not obtained, because the molar ratio $SiO_2/Al_2O_3$ of the starting reaction mixture is 500 and in turn, the molar ratio $SiO_2/Al_2O_3$ of the zeolite membrane becomes very high. In SEM-EDX of a zeolite membrane, the measurement limit value of the $SiO_2/Al_2O_3$ is usually considered to be about 100 and therefore, it is at least expected that the molar ratio $SiO_2/Al_2O_3$ of this zeolite membrane is 100 or more.

Example 7

Using the inorganic porous support-CHA-type zeolite membrane composite obtained in Example 1, separation utilizing selective permeation of water from a water/acetic acid mixed solution (50/50 wt %) at 70° C. by a pervaporation method was performed.

FIG. 1 shows a schematic view of the apparatus used for pervaporation. In FIG. 1, the inner side of the zeolite membrane composite 5 was decompressed by a vacuum pump 9, and the difference in the pressure from the outer side with which the solution 4 to be separated was contacted became about 1 atm. By this pressure difference, water as a permeable substance in the solution 4 to be separated is pervaporated and permeates the zeolite membrane composite 5. The substance permeated is collected by a trap 7. On the other hand, acetic acid is accumulated in the outer side of the zeolite membrane 5. The concentration of the solution 4 to be separated was measured at regular time intervals, and the separation coefficient at each time was calculated using the concentration.

The compositions of the permeated solution collected in the trap and the solution to be separated were analyzed by a gas chromatograph. Since the composition is stabilized in about 5 hours from the start of permeation, the permeation results after about 5 hours are shown.

The permeation flux was 4.0 kg/(m²·h), the separation coefficient was 384, and the concentration of water in the permeated solution was 99.74 wt %. The measurement results are shown in Table 1.

Example 8

Using the inorganic porous support-CHA-type zeolite membrane composite obtained in Example 2, separation utilizing selective permeation of water from a water/acetic acid mixed solution (50/50 wt %) at 70° C. by a pervaporation method was performed in the same manner as in Example 7.

The permeation flux was 4.8 kg/(m²·h), the separation coefficient was 544, and the concentration of water in the permeated solution was 99.81 wt %. The measurement results are shown in Table 1.

Figure 5:
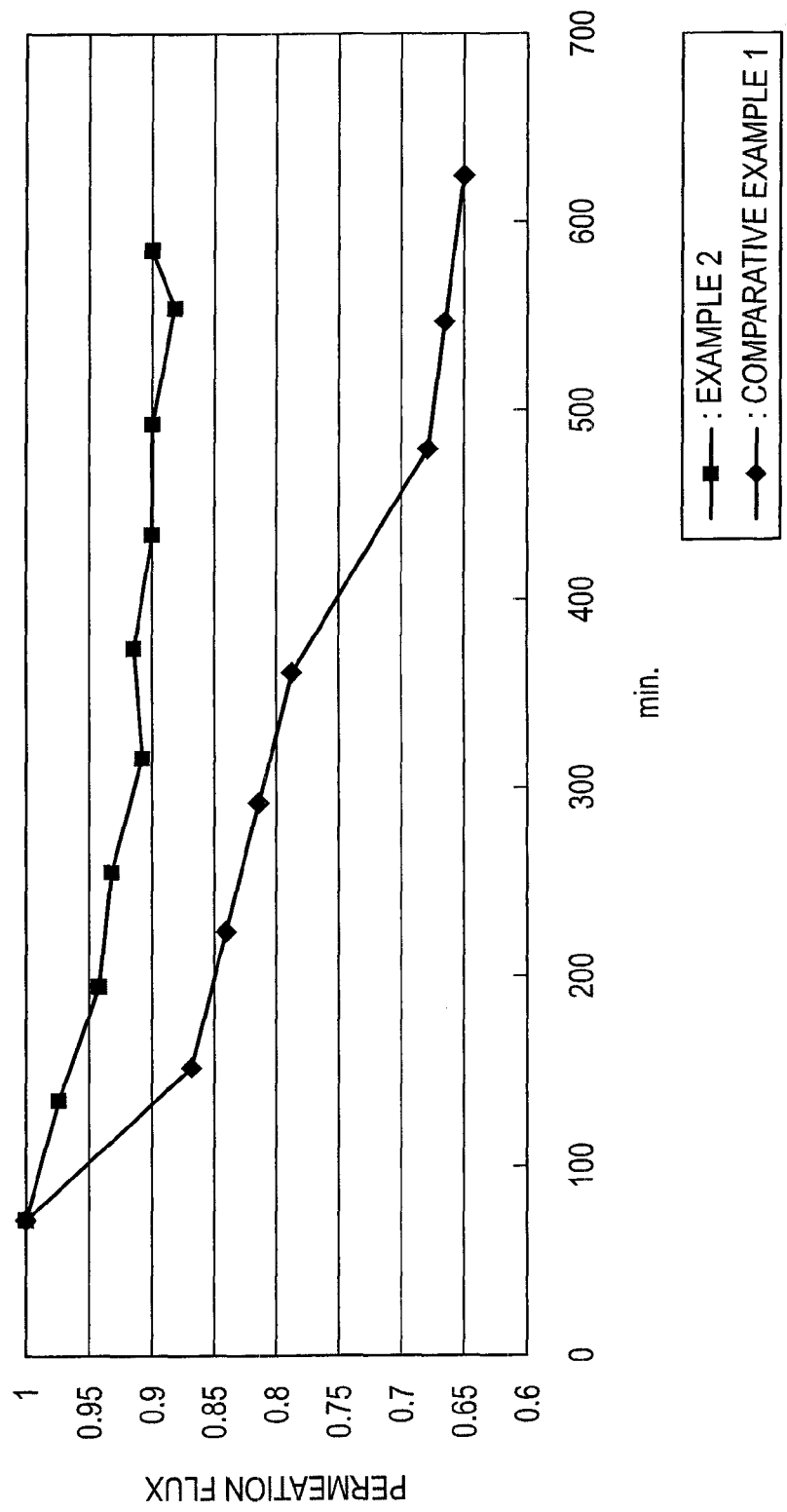
FIG. 5 The measurement results of water/acetic acid separation ability described in Example 8 and Comparative Example 1.

Also, the change of the permeation flux with aging was examined by continuing the separation for a long time. FIG. 5 is a graph plotting the change in about 10 hours after the start, assuming that the permeation flux 60 minutes after the start is 1. It is seen that the permeation flux is almost stabilized after about 5 hours.

Example 9

Using the inorganic porous support-CHA-type zeolite membrane composite obtained in Example 2, separation utilizing selective permeation of water from a water/acetic acid mixed solution (50/50 wt %) at 80° C. by a pervaporation method was performed in the same manner as in Example 7.

The permeation flux was 6.0 kg/(m$^2$●h), the separation coefficient was 649, and the concentration of water in the permeated solution was 99.84 wt %. The measurement results are shown in Table 1.

Example 10

Using the inorganic porous support-CHA-type zeolite membrane composite obtained in Example 2, separation utilizing selective permeation of water from a water/acetic acid mixed solution (10/90 wt %) at 70° C. by a pervaporation method was performed in the same manner as in Example 7.

The permeation flux was 1.4 kg/(m$^2$●h), the separation coefficient was 1,411, and the concentration of water in the permeated solution was 99.33 wt %. The measurement results are shown in Table 1.

Example 11

Using the inorganic porous support-CHA-type zeolite membrane composite obtained in Example 3, separation utilizing selective permeation of water from a water/acetic acid mixed solution (50/50 wt %) at 70° C. by a pervaporation method was performed in the same manner as in Example 7.

The permeation flux was 5.6 kg/(m$^2$●h), the separation coefficient was 230, and the concentration of water in the permeated solution was 99.57 wt %. The measurement results are shown in Table 1.

Example 12

Using the inorganic porous support-CHA-type zeolite membrane composite obtained in Example 4, separation utilizing selective permeation of water from a water/2-propanol aqueous solution (30/70 wt %) at 70° C. by a pervaporation method was performed in the same manner as in Example 7.

The permeation flux was 7.7 kg/(m$^2$●h), the separation coefficient was 3,000, and the concentration of water in the permeated solution was 99.92 wt %. The measurement results are shown in Table 2.

Example 13

Using the inorganic porous support-CHA-type zeolite membrane composite obtained in Example 5, separation utilizing selective permeation of water from a water/acetic acid mixed solution (50/50 wt %) at 70° C. by a pervaporation method was performed in the same manner as in Example 7.

The permeation flux was 4.6 kg/(m$^2$●h), the separation coefficient was 64, and the concentration of water in the permeated solution was 98.46 wt %. The measurement results are shown in Table 1.

Example 14

Using the inorganic porous support-CHA-type zeolite membrane composite obtained in Example 6, separation utilizing selective permeation of water from a water/acetic acid mixed solution (50/50 wt %) at 70° C. by a pervaporation method was performed in the same manner as in Example 7.

The permeation flux was 0.9 kg/(m$^2$●h), the separation coefficient was 26, and the concentration of water in the permeated solution was 96.30 wt %. The measurement results are shown in Table 1. The permeation flux, the separation coefficient and the concentration of water in the permeated solution were stabilized in about 3 hours and therefore, the values thereof are a value after about 3 hours.

Example 15

An inorganic porous support-CHA-type zeolite membrane composite was produced in the same manner as in Example 2 except for preparing the following as a reaction mixture for hydrothermal synthesis. In a mixture containing 12.9 g of 1 mmol/L-NaOH aqueous solution, 8.6 g of 1 mol/L-KOH aqueous solution and 92.4 g of water, 1.16 g of aluminum hydroxide (containing 53.5 wt % of $Al_2O_3$, produced by Aldrich) was added and dissolved with stirring to make a nearly transparent solution. Thereto, 2.91 g of an aqueous N,N,N-trimethyl-1-adamantanammonium hydroxide (TMA-DOH) solution (containing 25 wt % of TMADAOH, produced by Sachem) was added as an organic template, and 12.9 g of colloidal silica (Snowtex-40, produced by Nissan Chemicals Industries, Ltd.) was further added. This mixture was stirred for 2 hours to prepare the reaction mixture used for hydrothermal synthesis. From the difference between the weight of the membrane composite obtained and the weight of the support, the weight of the CHA-type zeolite crystallized on the support was 150 g/m$^2$.

XRD Measurement was performed in the same manner as in Example 1.

The (intensity of peak near 2θ=9.6°)/(intensity of peak near 2θ=20.8°) of the produced membrane was 12.8.

Also, the molar ratio $SiO_2/Al_2O_3$ of the zeolite membrane was measured by SEM-EDX and found to be 15.

Example 16

Using the inorganic porous support-CHA-type zeolite membrane composite obtained in Example 15, separation utilizing selective permeation of water from a water/acetic acid mixed solution (50/50 wt %) at 70° C. by a pervaporation method was performed in the same manner as in Example 7. The permeation flux was 4.5 kg/(m$^2$●h), the separation coefficient was 180, and the concentration of water in the permeated solution was 99.43 wt %. The measurement results are shown in Table 1.

Example 17

Using the inorganic porous support-CHA-type zeolite membrane composite obtained in Example 2, separation utilizing selective permeation of water from a water/2-propanol solution (10/90 wt %) at 70° C. by a pervaporation method was performed in the same manner as in Example 7.

The permeation flux was 4.0 kg/(m$^2$●h), the separation coefficient was 36,000, and the concentration of water in the permeated solution was 99.97 wt %. The measurement results are shown in Table 2.

Example 18

Using an inorganic porous support-CHA-type zeolite membrane composite obtained in the same manner as in Example 2, separation utilizing selective permeation of water from a water/2-propanol solution (30/70 wt %) at 70° C. by a pervaporation method was performed in the same manner as in Example 7.

The permeation flux was 5.8 kg/(m$^2$·h), the separation coefficient was 31,000, and the concentration of water in the permeated solution was 99.99 wt %. The measurement results are shown in Table 2.

Example 19

Using an inorganic porous support-CHA-type zeolite membrane composite obtained in the same manner as in Example 2, separation utilizing selective permeation of water from a water/2-propanol solution (30/70 wt %) at 50° C. by a pervaporation method was performed in the same manner as in Example 7.

The permeation flux was 2.5 kg/(m$^2$·h), the separation coefficient was 29,000, and the concentration of water in the permeated solution was 99.99 wt %. The measurement results are shown in Table 2.

Example 20

Using an inorganic porous support-CHA-type zeolite membrane composite obtained in the same manner as in Example 2, separation utilizing selective permeation of water from a water/tetrahydrofuran solution (50/50 wt %) at 50° C. by a pervaporation method was performed in the same manner as in Example 7.

The permeation flux was 3.1 kg/(m$^2$·h), the separation coefficient was 3,100, and the concentration of water in the permeated solution was 99.97 wt %. The measurement results are shown in Table 2.

Example 21

Using an inorganic porous support-CHA-type zeolite membrane composite obtained in the same manner as in Example 2, separation utilizing selective permeation of water from a water/acetone solution (50/50 wt %) at 40° C. by a pervaporation method was performed in the same manner as in Example 7.

The permeation flux was 1.6 kg/(m$^2$·h), the separation coefficient was 14,600, and the concentration of water in the permeated solution was 99.99 wt %. The measurement results are shown in Table 2.

Example 22

Using an inorganic porous support-CHA-type zeolite membrane composite obtained in the same manner as in Example 2, separation utilizing selective permeation of water from a water/N-methyl-2-pyrrolidone solution (50/50 wt %) at 70° C. by a pervaporation method was performed in the same manner as in Example 7.

The permeation flux was 5.6 kg/(m$^2$·h), the separation coefficient was 10,300, and the concentration of water in the permeated solution was 99.95 wt %. The measurement results are shown in Table 2.

Example 23

Using an inorganic porous support-CHA-type zeolite membrane composite obtained in the same manner as in Example 2, separation utilizing selective permeation of water from a water/ethanol solution (86/14 wt %) at 70° C. by a pervaporation method was performed in the same manner as in Example 7.

The permeation flux was 1.3 kg/(m$^2$·h), the separation coefficient was 500, and the concentration of water in the permeated solution was 99.97 wt %. The measurement results are shown in Table 2.

Example 24

Using an inorganic porous support-CHA-type zeolite membrane composite obtained in the same manner as in Example 2, separation utilizing selective permeation of methanol from a methanol/acetone solution (50/50 wt %) at 40° C. by a pervaporation method was performed in the same manner as in Example 7.

The permeation flux was 0.1 kg/(m$^2$·h), the separation coefficient was 670, and the concentration of methanol in the permeated solution was 99.86 wt %. The measurement results are shown in Table 2.

Comparative Example 1

For comparison, an inorganic porous support-MOR-type zeolite membrane composite was produced by hydrothermally synthesizing an MOR-type zeolite directly on an inorganic porous support, and separation utilizing selective permeation of water from a water/acetic acid mixed solution (50/50 wt %) at 70° C. was performed in the same manner as in Example 7.

The following was prepared as a reaction mixture for hydrothermal synthesis.

In a mixture containing 14.9 g of sodium hydroxide (97.0 wt %, produced by Junsei Chemical Co., Ltd.) and 69.5 g of water, 1.09 g of aluminum hydroxide (containing 53.5 wt % of $Al_2O_3$, produced by Aldrich) was added and dissolved with stirring to make a transparent solution. Thereto, 90.0 g of colloidal silica (Snowtex-40, produced by Nissan Chemicals Industries, Ltd.) was added, and this mixture was stirred for 2 hours to prepare a mixture for hydrothermal synthesis.

As the inorganic porous support, the same support as in Example 1 was used. In advance of hydrothermal synthesis, a slurry prepared by dispersing 5 wt % of MOR-type zeolite TSZ-640NAA produced by Tosoh Corporation in water was coated on the support to attach an MOR-type zeolite seed crystal. The weight of the seed crystal attached was about 6 g/m$^2$. This support attached with the seed crystal was dipped in the vertical direction in a Teflon (registered trademark)-made inner cylinder containing the reaction mixture above and after tightly closing the autoclave, heated at 160° C. for 8 hours under self-generated pressure. When a predetermined time was passed, the system was allowed to cool, and the support-zeolite membrane composite was taken out of the reaction mixture, washed and dried at 100° C. for 5 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m$^2$·min). From the difference between the weight of the membrane composite after drying and the weight of the support, the weight of the MOR-type zeolite crystallized on the support was about 35 g/m$^2$.

As a result of evaluation of the separation, the permeation flux was 0.38 kg/(m$^2$·h), the separation coefficient was 2,300, and the concentration of water in the permeated solution was 99.96 wt %.

It is seen from the results in Example 8 and Comparative Example 1 that the CHA membrane composite has high selective permeability equal to that of the MOR membrane composite and at the same time, has 10 times or more higher permeation flux than the MOR membrane composite.

Also, similarly to Example 8, the change of the permeation flux with aging was examined by continuing the separation for a long time. FIG. 5 is a graph plotting the change in about 10 hours after the start, assuming that the permeation flux 60 minutes after the start is 1. Compared with Example 8, reduction with aging is large, revealing that the CHA-type zeolite membrane composite is excellent also in view of stability.

Comparative Example 2

For comparison, an porous metal support-CHA-type zeolite membrane composite was produced by hydrothermally synthesizing a CHA-type zeolite directly on a metal mesh support, and separation utilizing selective permeation of water from a water/acetic acid mixed solution (50/50 wt %) at 70° C. was performed in the same manner as in Example 7.

As the metal mesh support, TFΦ14×L250 NF2M-02S2 manufactured by Nippon Seisen Co., Ltd. was used after cutting it to about 80 mm.

The following was prepared as a reaction mixture for hydrothermal synthesis.

In a mixture containing 32.0 g of 1 mol/L-NaOH aqueous solution and 74.55 g of water, 0.76 g of aluminum hydroxide (containing 53.5 wt % of $Al_2O_3$, produced by Aldrich) was added and dissolved with stirring to make a nearly transparent solution. Thereto, 27.00 g of an aqueous N,N,N-trimethyl-1-adamantanammonium hydroxide (TMADOH) solution (containing 25 wt % of TMADAOH, produced by Sachem Inc.) was added as an organic template, and 9.6 g of fumed silica (Aerosil 200, produced by Nippon Aerosil Co., Ltd.) was added. This mixture was stirred for 2 hours to prepare a mixture for hydrothermal synthesis.

The metal mesh support was treated in the same manner as in Example 1. In advance of hydrothermal synthesis, a CHA-type zeolite seed crystal of about 0.5 μm was attached on the support in the same manner as in Example 1. The weight of the seed crystal attached was about 18 g/m².

Similarly to Example 1, this support attached with the seed crystal was dipped in the vertical direction in a Teflon (registered trademark)-made inner cylinder containing the reaction mixture above and after tightly closing the autoclave, heated at 160° C. for 48 hours under self-generated pressure. When a predetermined time was passed, the system was allowed to cool, and the support-zeolite membrane composite was taken out of the reaction mixture, washed and dried at 100° C. for 4 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m².min). The zeolite membrane composite before template calcining was calcined in an electric furnace at 500° C. for 5 hours. From the difference between the weight of the membrane composite after calcining and the weight of the support, the weight of the CHA-type zeolite crystallized on the support was 280 g/m².

It was confirmed by XRD measurement that a CHA-type zeolite was produced on the surface of the base material. The XRD measurement was performed in the same manner as in Example 1.

In XRD of the produced membrane, the (intensity of peak near 2θ=9.6°)/(intensity of peak near 2θ=20.8°) was 0.8, and the (intensity of peak near 2θ=17.9°)/(intensity of peak near 2θ=20.8°) was 0.1.

In this way, a peak showing a specific intensity was not found in XRD of the produced membrane. This infers, for example, that the produced membrane is oriented to neither (1,0,0) plane nor (1,1,1) plane in the rhombohedral setting.

As a result of evaluation of the separation, the permeation flux was 0.48 kg/(m².h), the separation coefficient was 5, and the concentration of water in the permeated solution was 84.65 wt %.

As seen from the results in Comparative Example 2 and Examples 3, 4, 5, 6, 7 and 8, unlike the ceramic inorganic porous support-CHA membrane composite, the metal porous support-CHA membrane composite has low selective permeability and low permeation flux. It is presumed that in the metal porous support-CHA membrane composite where the value of (intensity of peak near 2θ=9.6°)/(intensity of peak near 2θ=20.8°) or (intensity of peak near 2θ=17.9°)/(intensity of peak near 2θ=20.8°) is small, unlike in the ceramic inorganic porous support-CHA membrane composite, a dense film is hardly formed.

Example 25

An inorganic porous support-CHA-type zeolite membrane composite was produced by hydrothermally synthesizing a CHA-type zeolite directly on an inorganic porous support.

The following was prepared as a reaction mixture for hydrothermal synthesis.

In 126 g of 1 mol/L-KOH aqueous solution, 5.7 g of aluminum hydroxide (containing 53.5 wt % of $Al_2O_3$, produced by Aldrich) was added and dissolved with stirring to make a nearly transparent solution. Thereto, 27 g of colloidal silica (Snowtex-40, produced by Nissan Chemicals Industries, Ltd.) was added, and this mixture was stirred for 2 hours to prepare a mixture for hydrothermal synthesis.

As the inorganic porous support, a support treated in the same manner as in Example 1 was used. In advance of hydrothermal synthesis, a CHA-type zeolite seed crystal of about 0.2 μm was attached on the support in the same manner as in Example 1. The weight of the seed crystal attached was about 3 g/m².

The CHA-type zeolite seed crystal of about 0.2 μm was synthesized as follows. To an aqueous solution obtained by dissolving 5 g of KOH in 100 g of water, 10 g of a Y-type zeolite having a ratio $SiO_2/Al_2O_3$ of 7 produced by Catalysts & Chemicals Ind. Co., Ltd. was added and stirred for 2 hours. The resulting reaction mixture was put in a Teflon (registered trademark)-made inner cylinder and after tightly closing the autoclave, heated at 100° C. for 7 days. Thereafter, the system was allowed to cool, and filtration and water washing were applied to obtain a CHA-type zeolite.

Similarly to Example 1, the support attached with the seed crystal was dipped in the vertical direction in a Teflon (registered trademark)-made inner cylinder containing the reaction mixture above and after tightly closing the autoclave, heated at 140° C. for 108 hours under self-generated pressure. When a predetermined time was passed, the system was allowed to cool, and the support-zeolite membrane composite was taken out of the reaction mixture, washed and dried at 100° C. for 4 hours or more. After the drying, the cylindrical tube-shaped membrane composite in the as-made state was sealed at one end, and the other end was connected to a vacuum line to reduce the pressure inside the tube. The permeation flux of air was measured by a flowmeter provided in the vacuum line, as a result, the permeation flux was 0 ml/(m²·min). From the difference between the weight of this membrane composite and the weight of the support, the weight of the CHA-type zeolite crystallized on the support was 50 g/m².

XRD of the produced membrane was measured, as a result, it was confirmed that a CHA-type zeolite was produced. In XRD of the produced membrane, the (intensity of peak near 2θ=9.6°)/(intensity of peak near 2θ=20.8°) was 0.3, and the (intensity of peak near 2θ=17.9°)/(intensity of peak near 2θ=20.8°) was 0.1.

In this way, a peak showing a specific intensity was not found in XRD of the produced membrane. This infers, for example, that the produced membrane is oriented to neither (1,0,0) plane nor (1,1,1) plane in the rhombohedral setting.

Also, the molar ratio $SiO_2/Al_2O_3$ of the zeolite membrane was measured by SEM-EDX and found to be 6.

Example 26

Using the inorganic porous support-CHA-type zeolite membrane composite obtained in Example 25, separation utilizing selective permeation of water from a water/2-propanol aqueous solution (30/70 wt %) at 70° C. by a pervaporation method was performed in the same manner as in Example 7.

The permeation flux was 3.9 kg/(m²·h), the separation coefficient was 21, and the concentration of water in the permeated solution was 90 wt %. The measurement results are shown in Table 2.

can be made therein without departing from the spirit and scope of the invention. This application is based on Japanese Patent Application (Patent Application No. 2009-46755) filed on Feb. 27, 2009 and Japanese Patent Application (Patent Application No. 2009-258274) filed on Nov. 11, 2009, the contents of which are incorporated herein by way of reference.

INDUSTRIAL APPLICABILITY

According to the present invention, a zeolite membrane composite for separation or concentration, ensuring practically required large treating amount and adequate separation performance when concentrating a specific compound from an organic material-containing gas or liquid mixture, is obtained, which enables zeolite membrane-assisted separation or concentration from an organic material-containing gas or liquid mixture.

Also, according to the present invention, a zeolite membrane composite for separation or concentration having excellent acid resistance is obtained, which enables separation/concentration of a mixture containing an organic acid such as acetic acid. In particular, the zeolite membrane composite can be effectively utilized, for example, for separation or concentration of an organic acid by selective permeation of

TABLE 1

| | Zeolite Membrane Composite | Mixture Separated | Concentration (wt %) | Temperature (° C.) | Permeation Flux (kg/(m²·h)) | Separation Coefficient | Concentration of Water in Permeated Solution (wt %) |
|---|---|---|---|---|---|---|---|
| Example 7 | Example 1 | water/acetic acid | 50/50 | 70 | 4.0 | 384 | 99.74 |
| Example 8 | Example 2 | water/acetic acid | 50/50 | 70 | 4.8 | 544 | 99.81 |
| Example 9 | Example 2 | water/acetic acid | 50/50 | 80 | 6.0 | 649 | 99.84 |
| Example 10 | Example 2 | water/acetic acid | 10/90 | 70 | 1.4 | 1411 | 99.33 |
| Example 11 | Example 3 | water/acetic acid | 50/50 | 70 | 5.6 | 230 | 99.57 |
| Example 13 | Example 5 | water/acetic acid | 50/50 | 70 | 4.6 | 64 | 98.46 |
| Example 14 | Example 6 | water/acetic acid | 50/50 | 70 | 0.9 | 26 | 96.30 |
| Example 16 | Example 15 | water/acetic acid | 50/50 | 70 | 4.5 | 180 | 99.43 |
| Comparative Example 1 | Comparative Example 1 | water/acetic acid | 50/50 | 70 | 0.38 | 2300 | 99.96 |
| Comparative Example 2 | Comparative Example 2 | water/acetic acid | 50/50 | 70 | 0.48 | 5 | 84.65 |

TABLE 2

| | Zeolite Membrane Composite | Mixture Separated | Concentration (wt %) | Temperature (° C.) | Permeation Flux (kg/(m²·h)) | Separation Coefficient | Concentration of Water in Permeated Solution (wt %) |
|---|---|---|---|---|---|---|---|
| Example 12 | Example 4 | water/2-propanol | 30/70 | 70 | 7.7 | 3000 | 99.92 |
| Example 17 | Example 2 | water/2-propanol | 10/90 | 70 | 4.0 | 36000 | 99.97 |
| Example 18 | Example 2 | water/2-propanol | 30/70 | 70 | 5.8 | 31000 | 99.99 |
| Example 19 | Example 2 | water/2-propanol | 30/70 | 50 | 2.5 | 29000 | 99.99 |
| Example 20 | Example 2 | water/THF | 50/50 | 50 | 3.1 | 3100 | 99.97 |
| Example 21 | Example 2 | water/acetone | 50/50 | 40 | 1.6 | 14600 | 99.99 |
| Example 22 | Example 2 | water/N-methyl-2-pyrrolidone | 50/50 | 70 | 5.6 | 10300 | 99.95 |
| Example 23 | Example 2 | water/ethanol | 86/14 | 70 | 1.3 | 500 | 99.97 |
| Example 24 | Example 2 | methanol/acetone | 50/50 | 40 | 0.1 | 670 | 99.86 |
| Example 26 | Example 25 | water/2-propanol | 30/70 | 70 | 3.9 | 21 | 90 |

While the invention has been described in detail and with reference to specific embodiments thereof, it will be apparent to one skilled in the art that various changes and modifications water from a mixture of water and an organic acid such as acetic acid, or for separation of water so as to accelerate an esterification reaction.

DESCRIPTION OF REFERENCE NUMERALS AND SIGNS

| | |
|---|---|
| 1 | Stirrer |
| 2 | Hot water bath |
| 3 | Stirring bar |
| 4 | Solution to be separated |
| 5 | Zeolite membrane composite |
| 6 | Pirani gauge |
| 7 | Trap for collecting permeated solution |
| 8 | Cold strap |
| 9 | Vacuum pump |

The invention claimed is:

1. An inorganic porous support-zeolite membrane composite, wherein the inorganic porous support contains a ceramic sintered body and the inorganic porous support-zeolite membrane composite has, as the zeolite membrane, a CHA-type zeolite crystal layer on the inorganic porous support surface, and in the X-ray diffraction pattern obtained by irradiating the zeolite membrane surface with an X-ray, the peak intensity near $2\theta=17.9°$ is 0.5 times or more the peak intensity near $2\theta=20.8°$.

2. An inorganic porous support-zeolite membrane composite, wherein the inorganic porous support-zeolite membrane composite has a CHA-type zeolite crystal layer as the zeolite membrane and in the X-ray diffraction pattern obtained by irradiating the zeolite membrane surface with an X-ray, the peak intensity near $2\theta=17.9°$ is 0.5 times or more the peak intensity near $2\theta=20.8°$.

3. An inorganic porous support-zeolite membrane composite, wherein the inorganic porous support-zeolite membrane composite has a CHA-type zeolite crystal layer as the zeolite membrane and in the X-ray diffraction pattern obtained by irradiating the zeolite membrane surface with an X-ray, the peak intensity near $2\theta=9.6°$ is 4 times or more the peak intensity near $2\theta=20.8°$.

4. The inorganic porous support-zeolite membrane composite as claimed in claim 1, wherein in the X-ray diffraction pattern obtained by irradiating the zeolite membrane surface with an X-ray, the peak intensity near $2\theta=9.6°$ is 4 times or more the peak intensity near $2\theta=20.8°$.

5. The inorganic porous support-zeolite membrane composite as claimed in claim 1, wherein the molar ratio $SiO_2/Al_2O_3$ of the zeolite crystal layer is 5 or more.

6. The inorganic porous support-zeolite membrane composite as claimed in claim 1, wherein the inorganic porous support comprises at least one kind of a material selected from the group consisting of alumina, silica and mullite.

7. A method for producing the inorganic porous support-zeolite membrane composite claimed in any one of claims 1 to 3, which comprises crystallizing a CHA-type zeolite on the inorganic porous support surface.

8. The method of producing the inorganic porous support-zeolite membrane composite as claimed in claim 7, wherein after attaching a zeolite seed crystal to the inorganic porous support surface, the CHA-type zeolite is crystallized.

9. The method of producing the inorganic porous support-zeolite membrane composite as claimed in claim 8, wherein the zeolite seed crystal is a CHA-type zeolite.

10. The method of producing the inorganic porous support-zeolite membrane composite as claimed in claim 7, wherein in performing crystallization of the CHA-type zeolite, a reaction mixture containing an Si element source and an Al element source is used as a raw material such that the molar ratio ($SiO_2/Al_2O_3$) as the ratio between Si and Al in terms of respective oxides becomes from 5 to 10,000.

11. The method of producing the inorganic porous support-zeolite membrane composite as claimed in claim 10, wherein an alkali metal ion is present in the reaction mixture.

12. The method of producing the inorganic porous support-zeolite membrane composite as claimed in claim 10, wherein an organic template is further used as a raw material and the organic template is a cation derived from 1-adamantanamine.

13. A separation membrane comprising the inorganic porous support-zeolite membrane composite claimed in claim 1.

14. A separation method comprising contacting an organic material-containing gas or liquid mixture with the inorganic porous support-zeolite membrane composite claimed in any one of claims 1 to 3 to allow for permeation of a highly permeable substance out of said mixture, thereby separating said highly permeable substance from said mixture.

15. The separation method as claimed in claim 14, wherein the organic material-containing gas or liquid mixture is a mixture of an organic acid and water.

16. The separation method as claimed in claim 14, wherein the organic material-containing gas or liquid mixture is a mixture of water and at least one kind of a material selected from organic compounds containing an alcohol, an ether, an aldehyde, a ketone or a nitrogen.

17. A concentration method comprising contacting an organic material-containing gas or liquid mixture with the inorganic porous support-zeolite membrane composite claimed in any one of claims 1 to 3 to allow for permeation of a highly permeable substance out of said mixture, thereby concentrating the highly permeable substance.

18. The concentration method as claimed in claim 17, wherein the organic material-containing gas or liquid mixture is a mixture of water and at least one kind of a material selected from organic compounds containing an alcohol, an ether, an aldehyde, a ketone or a nitrogen.

19. The inorganic porous support-zeolite membrane composite as claimed in claim 2, wherein in the X-ray diffraction pattern obtained by irradiating the zeolite membrane surface with an X-ray, the peak intensity near $2\theta=9.6°$ is 4 times or more the peak intensity near $2\theta=20.8°$.

20. The inorganic porous support-zeolite membrane composite according to claim 2, wherein the molar ratio $SiO_2/Al_2O_3$ of the zeolite crystal layer is 5 or more.

21. The inorganic porous support-zeolite membrane composite according to claim 3, wherein the molar ratio $SiO_2/Al_2O_3$ of the zeolite crystal layer is 5 or more.

22. The inorganic porous support-zeolite membrane composite according to claim 2, wherein the inorganic porous support comprises at least one kind of a material selected from the group consisting of alumina, silica and mullite.

23. The inorganic porous support-zeolite membrane composite according to claim 3, wherein the inorganic porous support comprises at least one kind of a material selected from the group consisting of alumina, silica and mullite.

24. A separation membrane comprising the inorganic porous support-zeolite membrane composite according to claim 2.

25. A separation membrane comprising the inorganic porous support-zeolite membrane composite according to claim 3.

* * * * *